United States Patent
Harms

(10) Patent No.: US 11,176,523 B2
(45) Date of Patent: Nov. 16, 2021

(54) SYSTEM AND METHOD FOR INTELLIGENT CONVERSATION-BASED APPOINTMENT TOOL

(71) Applicant: Harms Software Inc., Parsippany, NJ (US)

(72) Inventor: John T. Harms, Reddick, FL (US)

(73) Assignee: Harms Software, Inc., Parsippany, NJ (US)

(*) Notice: Subject to any disclaimer, the term of this patent is extended or adjusted under 35 U.S.C. 154(b) by 635 days.

(21) Appl. No.: 13/924,588

(22) Filed: Jun. 23, 2013

(65) Prior Publication Data

US 2014/0006082 A1  Jan. 2, 2014

Related U.S. Application Data

(60) Provisional application No. 61/663,611, filed on Jun. 24, 2012.

(51) Int. Cl.
*G06Q 10/00* (2012.01)
*G06Q 10/10* (2012.01)

(52) U.S. Cl.
CPC .................. *G06Q 10/1095* (2013.01)

(58) Field of Classification Search
None
See application file for complete search history.

(56) References Cited

U.S. PATENT DOCUMENTS

| | | | |
|---|---|---|---|
| 7,158,980 B2 | 1/2007 | Shen | |
| 7,558,731 B1 | 7/2009 | Hodjat et al. | |
| 7,613,719 B2 | 11/2009 | Chang et al. | |
| 7,720,674 B2 | 5/2010 | Kaiser et al. | |
| 8,346,791 B1* | 1/2013 | Shukla | G06F 17/30864 707/759 |
| 2004/0267585 A1* | 12/2004 | Anderson | G06Q 10/02 705/5 |
| 2009/0006143 A1 | 1/2009 | Orttung et al. | |
| 2009/0112679 A1 | 4/2009 | Machtelinck | |
| 2009/0158173 A1* | 6/2009 | Palahnuk | G06Q 30/00 715/753 |
| 2009/0210351 A1* | 8/2009 | Bush | G06Q 10/109 705/80 |

(Continued)

OTHER PUBLICATIONS

Harkins, Configure Outlook's Calendar view to suit your work routine, May 23, 2016, https://www.techrepublic.com/article/configure-outlooks-calendar-view-to-suit-your-work-routine/ (Year: 2016).*

*Primary Examiner* — Rutao Wu
*Assistant Examiner* — Scott M Ross
(74) *Attorney, Agent, or Firm* — Bakos & Kritzer

(57) ABSTRACT

Disclosed is a conversation-based intelligent scheduling and appointment system and method. The system and method are designed to be capable of interpreting natural language, analyzing the natural language to reduce the language to data inputs, and displaying scheduling information such as appointment/event times, locations, and substantive information organized and presented in a format based on the data inputted by an operator. The display of the available appointment information is prioritized and dynamically displayed based on the natural language, regardless of the style or format of the natural language input in such a manner as to avoid superfluous information.

25 Claims, 17 Drawing Sheets

(56) References Cited

U.S. PATENT DOCUMENTS

2011/0184768 A1\* 7/2011 Norton .................. G06Q 10/02
705/5
2012/0016678 A1 1/2012 Gruber et al.

\* cited by examiner

Input: "Haircut Tomorrow" ⌒1100

| Requested Dimension — 1102 |
|---|
| Requested Dimensions<br>   Requested Dimension(Service Category = HAIRCUT,<br>   Employee = ANYONE)<br>Date Range<br>   02 Jan<br>Mandatory<br>   Default<br>Date Position<br>   Default |

1104

| Haircut — 1106 ||
|---|---|
| Kelly | Joe |
| 02 Jan | 02 Jan |

Input: "Haircut with Kelly, Massage with Anyone in Room 1 today or tomorrow" 1400

| Requested Dimension |
|---|
| Requested Dimensions<br>   Requested Dimension(Service Category = HAIRCUT,<br>   Employee = ANYONE)<br>   Requested Dimension(Service Category = MASSAGE,<br>   Employee = KELLY)<br>Date Range<br>   01 Jan<br>Mandatory<br>   Default<br>Date Position<br>   Default |

1402

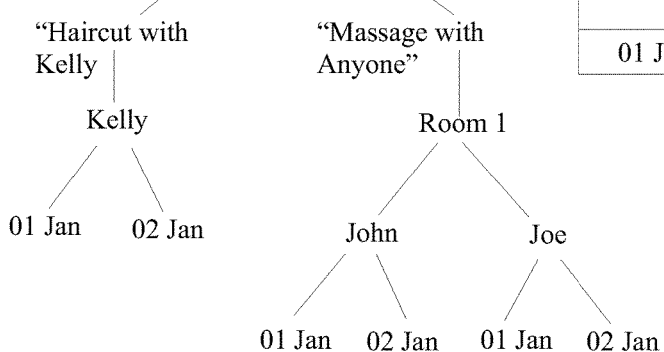

1404

| Haircut with Kelly | | Massage with Anyone | |
|---|---|---|---|
| Kelly | | John | Joe |
| | | ROOM1 | ROOM1 |
| 01 Jan | 02 Jan | 01 Jan | 02 Jan |

SYSTEM AND METHOD FOR INTELLIGENT CONVERSATION-BASED APPOINTMENT TOOL

CROSS REFERENCE TO RELATED APPLICATION

This application claims the benefit of U.S. patent application Ser. No. 61/663,611, filed Jun. 24, 2012.

FIELD OF INVENTION

The present invention relates to scheduling and appointment systems and methods, and more particularly, to conversation-based intelligent scheduling and appointment systems and methods.

BACKGROUND OF INVENTION

Traditionally, in various service industries, scheduling an appointment has involved using a paper-based scheduling/appointment book for recording information associated with the appointment, including the date, name of the customer, and the requested service to be provided. Each page in a scheduling/appointment book displays either a day, week, or month view. For example a calendar week view consists of columns representing the days of the week and rows representing available and scheduled time slots. Generally the header of each column is the full or abbreviated day of the week and data related to a particular event is entered into an appropriate time-slot on the requested day. Pages of traditional scheduling/appointment books are often organized for displaying information about the customer/client for a particular appointment time slot by dividing a day page into rows and columns or other variations thereof allowing an operator to customize the input with respect to a particular event. Nevertheless, before scheduling an appointment, the operator of the service provider's appointment system scans through extraneous information regardless of whether a day, month, or calendar view is utilized, while searching for an empty appointment block.

Computer programs for appointment scheduling have attempted to alleviate the myriad of problems associated with paper-based systems by streamlining the input process and review process. While computer-based systems have been evolving, typical examples of current known systems commonly employed in the art include applications such as Microsoft Outlook® from Microsoft Corporation of Redmond Washington or Google Calendar® from Google Inc. from Mountain View, Calif. These computer-based applications offer numerous advantages over the traditional paper-based scheduling/appointment systems including the ability to vary the presentation of appointments. However, these (and other existing computer-based) systems still exhibit inherent disadvantages. Specifically, the common presentation of an electronic calendar when depicting the availability of appointment blocks is identical to the traditional scheduling/appointment book presentation of a day, week, or month calendar view. Although various improvements attempt to avoid visual clutter and provide visual keys which highlight important events, available time slots, etc. to the operator, the day, week, or month calendar view persists. As a result the operator must scan through full days, weeks, or months containing extraneous data, before finding a suitable available appointment spot. In addition, computer-implemented methods and systems introduce useability problems in that the operators of these systems are required to learn the specifics associated with the particular interface before efficiently initiating a search and maintaining the database of inputted events, contacts, etc. In many cases this "learning curve" may be steep requiring excessive time and resource demand of the operator.

Today, the usability problem is further exasperated as customers faced with a multitude of various scheduling system interfaces may not be familiar with the particular service provider's appointment/scheduling interface. In many of these situations, a human or electronic operator may be employed to guide the customer through various scripts so that the customer provides information in a prescribed format. Particularly, when the customer interacts with an operator for scheduling an appointment, the operator typically requests information about the customer's preferences, availability, and other identifying data and uses the criteria in the responses to search through available time slots. The view on the operator's monitor generally reflects a complete time period (i.e. month, week or day) calendar view and frequently contains all of the information associated with the time period concerning available and non-available time slots, including the type of service offered or available employees. As a result, the operator is required to scan all of the information associated with a particular month, week, or day in order to locate a suitable time slot for each potential customer, necessarily requiring the operator to sift through extraneous and irrelevant information. For example, in a month view the operator inevitably scans the whole calendar regardless of the relevant available slot that coincides with the requested service—an inefficient process especially considering the available time slot may be weeks or months in the future. In addition to delays inherent in the process due to the necessary review of extraneous information, the inefficient process of scanning a calendar view further delays the response of operators that are not fully trained with the service provider's scheduling/appointment computer Such inherent disadvantages in known systems have not been entirely ignored in the industry. For example, various inventions improve the operator's efficiency by using color coding or highlighting to readily accentuate available time slots in the calendar view. This arguably allows the operator's eyes to gravitate toward a particular color scheme and to ignore entries portrayed as a specific color indicating an unavailable time slot. Current scheduling systems may also include a function to eliminate redundancy such as the requirement of clients/customers registering after a first use of the system. Therefore, upon subsequent access to the appointment/scheduling computer system, a database is probed for relevant information related to a particular customer to expedite scheduling appointments, such as the customer's previous search criteria for an appointment. In both cases the improvements use a day, week or month calendar view, so the problems associated with scanning extraneous information still persists.

In lieu of the operator-based systems, current scheduling systems may allow customers to directly interact with the service provider's computer system through an online network. Typically for an on-line Internet interaction the customer interacts with a graphical user interface ("GUI") consisting of buttons, drop-down menus, and text fields to allow the customer to input the search criteria for finding available time slots. Generally the remote computer server will return the available appointment blocks in a month, week, or date calendar view. Unfortunately, in order to locate an appropriate available time slot, customers using these GUIs also experience the inefficiencies associated with scanning extraneous data provided by the systems. Finally, since customers use various scheduling interfaces for the multitude of services provided, some interfaces may be burdensome to learn or simply overwhelming, because customers infrequently use the systems.

Since customers are required to interface with multiple services with unique interfaces (e.g., to make appointments with the telephone company, cable company, etc.), there is a growing trend for intelligent software designed to alleviate the burdens of use and education related to these interfaces. Unlike traditional software, intelligent software takes into account the context surrounding the operator interacting with the software. To better facilitate usability, intelligent software is designed to consider various parameters beyond the traditional inputted information to determine and further refine an operator's request. The flow of communications in this scenario generally takes the form of a back and forth conversation between the operator and the intelligent software. An example of this type of conversation-based search engine can be found in co-pending Gruber et al. U.S. patent application Ser. No. 12/987,982 entitled "Intelligent Automated Assistant." As discussed in the Gruber et al. disclosure, the disclosed software adjusts recommendations in response to the questions posed to the operator and the operator's answers to the posed questions, in much the same way a common conversation is conducted. In addition to the data collected as a result of the "conversation," additional data points are supplied based on certain aspects of the operator such as long or short term data maintained by the input device related to the operator's preferences or the operator's location determined by the input device. One example of this type of inquiry that is presented in the Gruber et al. application relates to a restaurant search. For example, an operator can simply ask the intelligent software "where may I get some good Italian around here?" A language interpreter of the intelligent software parses the text input and generates a list of possible interpretations of the operator's intent. The phrase "Italian" is associated with restaurants of style Italian; "good" is associated with the recommendation property of restaurants, and "around here" is associated with a location parameter. Then based on several external services such as location, restaurants, and ratings, the intelligent software searches for Italian restaurants that are recommended within the vicinity of the operator. A dialog summary of the results is returned, such as "I found some recommended Italian restaurants near here." Although intelligent software may ease the burden of learning various interfaces for locating a restaurant, the view presented when the operator makes an appointment at a restaurant typically remains the traditional calendar view. As a result, the same problem of the operator viewing extraneous information persists.

Another problem with the day, week, and month calendar view is that it does not facilitate an operator quickly understanding the context of their search in a situation where the operator is distracted by other functions before completing the appointment. As a result, when the operator returns to complete the appointment at a later time, it may take an operator additional time to understand, establish, and re-purpose the appointment.

Accordingly a need exists in the art for a way to access and organize scheduling information for appointments or events using natural language and for intelligently displaying the information in a manner that provides context of the operator's intent.

In addition, a need exists in the art for a system and method of recognizing a operator and using operator preferences in such a manner as to streamline data input.

A further need in the art exists for a system and method capable of acknowledging keywords, regardless of input device, inputted at any position in a series to intelligently determine an operator request independent of operator-inputted format.

Another apparent need in the art is for a conversation-based intelligent interaction between an operator and an appointment book capable of acknowledging available time slots based on operator input.

The art also does not exhibit a system and method designed to lexically process inputted conversation for identifying key verbs and nouns associated for a specific process related to scheduling appointments.

A need in the art exists for a system and method capable altering filtered dimensions on an appointment book via entered nouns such as "time," "date," "service," "resources," etc. or entered verbs based on the data inputted via a conversation.

A further need in the art exists for a system and method with the ability to infer that a conversation is new and unrelated to an existing event based on the inputted nouns or verbs and pre-populating data based on known criterion established in memory related to a particular operator.

There also exists a need in the art for a system and method for inferring based on inputted key verbs or nouns to alter, reschedule, or cancel an appointment maintained in an appointment book.

A further need in the art exists for a system and method capable of refining inputted data based on operator preferences and operator location inputted via a conversation or maintained in memory based on prior inputs.

While aforementioned systems and methods are generally suitable for a particular purpose, such systems and methods are not sufficiently suitable for the purpose discussed in detail in the present invention. Thus, it is clear that there exists a need in the art for a conversation-based intelligent appointment tool that overcomes these problems and progresses the state of the art, as well as one that provides the additional benefits enumerated in the present application.

SUMMARY OF INVENTION

According to various embodiments of the present invention, an intelligent appointment system and method is disclosed designed to be capable of interpreting natural language, analyzing the natural language to reduce the language to data inputs, and displaying scheduling information such as appointment/event times, locations, and substantive information organized and presented in a format based on the data inputted by an operator. The display of the available appointment information is prioritized and dynamically displayed based on the natural language, regardless of the style or format of the natural language input in such a manner as to avoid superfluous information.

The appointment system and method can be tailored for numerous service-related industries. While it is contemplated by the present invention that the system and method of the present invention be utilized in these various environments, for ease of reference, the system and method of the present invention will be described in relation to the beauty and spa services industry—an industry where establishing and maintaining appointments is critical to success.

In one embodiment a hierarchy of the natural language input is generated whereby a header is displayed at the top based on the input. Subsequent query bars are displayed under the formed header based on additional inputted data afterward. For example, in a hair salon environment, a customer may call a hair salon to book an appointment. Upon connection, the calling individual is routed to interface to the tool of the present invention, either with or without human interaction. In this instance, the tool is capable of receiving data in the form of natural language systems which are common and well known to one of ordinary skill in the art. If the caller speaks the words "haircut tomorrow," the natural language interpreter (either human or electronic) of the present invention converts the input into a data string and performs a search for "haircut tomorrow." This search results in an display of a first column with the header "haircut." Displaying the header "haircut" can be optional. Within the "haircut" header column, a plurality of subsections are generated representing an employee or the employees (or if the service cannot be performed, the system will acknowledge such a result and not list any available return) that can perform the requested haircut service. In addition to the individual capable of performing the service, the system can display available times within each respective employee subsection. As a result, a tailored search window is dynamically generated based on the operator input (e.g., in this instance, natural language spoken by the operator). Thus, rather than displaying unnecessary information such as pages of detailed appointments for an extended duration, the dynamic display is tailored to the desired inquiry. While the preferred embodiment of the present invention is geared to generate a display delivered to a live agent, one of ordinary skill in the art will readily recognize that most, if not all of the functions of the present invention may be performed independent of human interaction.

As another example, in the event the operator speaks the phrase "appointment tomorrow for a haircut" the display presents a column header containing tomorrow's date. Similar to the previous example, within the "tomorrow" header column, a plurality of subsections are generated representing an employee or the employees (or if the service cannot be performed, the system will acknowledge such a result and not list any available return) that can perform the requested haircut service. In addition to the individual capable of performing the service, the system can display available times within each respective employee subsection. Similarly, the display of available appointments is prioritized by the natural language that the operator inputted.

According to various embodiments of the present invention, the display of available scheduling information is prioritized based on configuring various properties. As a result the view can be configured to result in terms appearing in the same hierarchy position regards of their position in natural language. For example, the search for "haircut tomorrow" and "tomorrow for a haircut" can be configured so that the results are displayed in substantially the same order, instead of being prioritized by the natural language input.

BRIEF DESCRIPTION OF THE DRAWINGS

A further understanding of the present invention and the objectives other than those set forth above can be obtained by reference to the various implementations set forth in the illustrations of the accompanying figures. Although the implementations illustrate certain aspects of the present invention, including the apparatus and method of use of the invention, in general, together with further objectives and advantages thereof, the invention may be more easily understood by reference to the drawings, examples, and the following description. One skilled in the art will recognize that the examples and figures are not intended to limit the scope of this invention, which is set forth with particularity in the claims as appended or as subsequently amended, but merely to clarify and exemplify the invention. The detailed description makes reference to the accompanying figures wherein:

FIG. 11, FIG. 12, FIG. 13, and FIG. 14 depict various examples of the intelligent conversation-based appointment tool operation in relation to defining the request dimension for various inputs and the subsequent response dimension.

DETAILED DESCRIPTION OF THE EMBODIMENTS

A detailed description of the various embodiments of the present invention is disclosed herein. However, techniques of manufacture and resulting structures in accordance with the present invention may be embodied in a wide variety of forms and modes, some of which may be quite different from those in the disclosed embodiments. Consequently, the specific structural details disclosed herein are merely representative, yet in that regard, they are deemed to represent suitable implementations for purposes of disclosure and to provide a basis for the claims herein, which define the scope of the present invention. Well known methods, procedures, and substances for both carrying out the objectives of the present invention and illustrating the preferred embodiment are incorporated herein but have not been described in detail as not to unnecessarily obscure novel aspects of the present invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, electronic or otherwise, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the Detailed Description of the Embodiments using the singular or plural number may also include the plural or singular number respectively. The word "or," in reference to a list of two or more items, covers all of the following interpretations of the word: any of the items in the list, all of the items in the list, and any combination of the items in the list.

Figure 1:
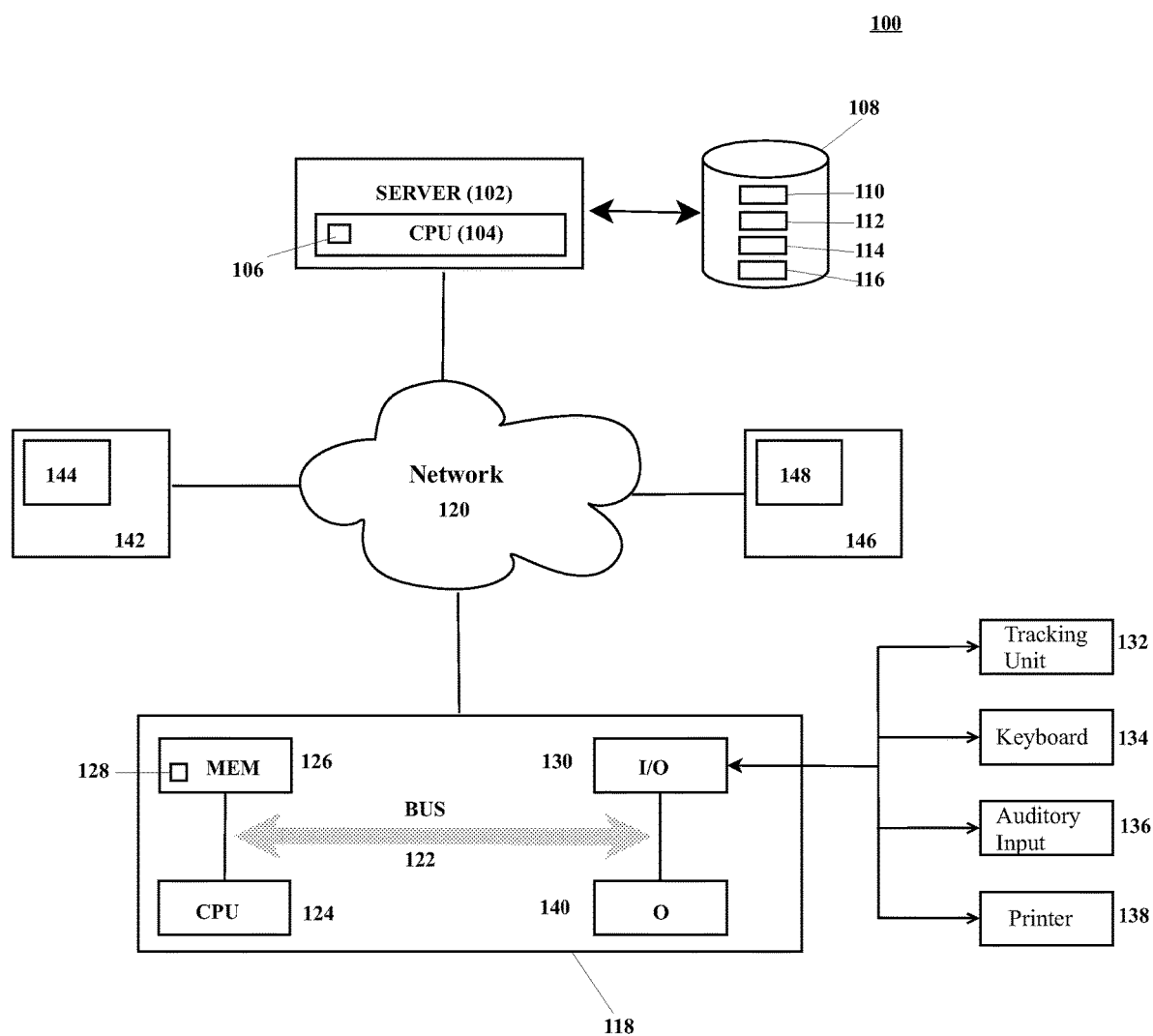
FIG. 1 is a block diagram depicting a computer system architecture for implementing the intelligent conversation-based appointment tool and dynamically populating a scheduling system in accordance with various embodiments of the present invention.

Referring now to FIG. 1, presented is a computer system 100 which implements the methods and systems of the present disclosure. Generally, the intelligent conversation-based appointment tool techniques disclosed herein can be implemented on hardware or a combination of software and hardware. In the preferred embodiment, the techniques disclosed herein are implemented in software such as an operating system or in an application running on an operation system. The software can include, but is not limited to firmware, resident software, microcode, etc. or is implemented on a cloud-based or visualized network system.

The present invention can take the form of a computer program product accessible from a computer-usable or computer-readable medium providing program code for use by or in connection with a computer or any instruction execution system or device. For example, a computer-usable or computer readable medium can be any apparatus that can contain, store, communicate, or transport the program for use by or in connection with the instruction execution system, apparatus, or device.

Various embodiments of the system and methods described below are implemented by a program product comprising a machine-readable media having a machine-executable program of instructions, which when executed by a machine, such as a computer, performs the steps of the methods. This program can be stored on a variety of known machine-readable media, including but not limited to compact discs, floppy discs, USB memory devices, and the like. In addition, the program product can be in the form of a machine readable transmission currently known or developed in the future, such as blu-ray, HTML, XML, or the like.

The computer system 100 comprises a server 102 with a computer processing unit (CPU) 104. One of ordinary skill in the art will readily recognize that computer system 100 is a simplified view of the system architecture of the present invention and can include additional elements that are not depicted, wherein the inclusion of the additional element will not depart from the spirit of the present invention. For example, although a single stand-alone server 102 is depicted in the figure, fewer or a greater number of servers (or server-like devices), can be connected to one or more data storage systems depending on the desired architecture.

Furthermore, the server 102 can be local, remote, or a combination thereof. Server 102 is configured to enable communication over network 120. In addition, server 102 provides for a multiplicity of terminals 118, 142 and 146 to connect with server 102 over network 120. For example, in a terminal/server architecture, an operator interconnects through network 120 using a terminal such as a personal computer (PC) or mobile communication device. Examples of mobile communication devices include but are not limited to a mobile telephone, cellular telephone, smart telephone, laptop computer, netbook, personal digital assistant (PDA), or any other computing device suitable for network communication.

Network 120 can be a local area network (LAN), a wide area network (WAN), the internet, cellular networks, satellite networks or any other network that permits the transfer and/or reception of data to and/or from terminals 118, 142 and 146. The data transmitted to/from terminals 118, 142 and 146 to server 102 through network 120 can be transmitted and/or received utilizing standard telecommunications protocol or standard networking protocol. For example, in one embodiment it is likely that the system utilizes Transmission Control Protocol/Internet Protocol (TCP/IP). Other examples of protocols for transmitting and/or receiving data include but are not limited to Voice Over IP (VOIP) protocol, Short Message Service (SMS), and Global System for Mobile Communications (GSM). Network 120 is capable of utilizing one or more protocols of terminals 118, 142 and 146. Furthermore network 120 can translate to or from other protocols to one or more protocols of terminals 118, 142 and 146. In at least one embodiment, network 120 is the Internet.

Computer system 100 of the present invention further includes an operating system 106 installed and running on server 102, enabling server 102 to communicate through network 120 with the terminals 118, 142, and 146. A memory 108 is interconnected with the server 102. Memory 108 can be integral with server 102 or external to server 102 and interconnected within. A program of instruction 116 is stored on memory 108. According to an exemplary embodiment, the program 116 is computer executable code for accessing and organizing scheduling information for appointments or events using natural language and for intelligently displaying the information in a manner that provides context of the operator's intent. Alternatively, portions of the program for searching for available appointments may be installed on terminals 118, 142 and 146. In one embodiment, the computer system is cloud computing based, with the remote client/customer computing device capable of accessing the computer system 100 to schedule an appointment through the Internet or other network.

According to an exemplary embodiment, one or more of terminals 118, 142, and 146 is a personal computer. As depicted, turning specifically to terminal 118, terminal 118 comprises a bus 122 interconnected to network 120 such as through a modem, Ethernet card, or any other network connectivity interface. A computer processing unit (CPU) 124 is interconnected to bus 122. A memory 126 is interconnected to CPU 124 through bus 122. The terminal 118 can also comprise one or more input/output devices 130, such as a tracking unit 132, a keyboard 134, auditory input 136, a printer 138, and the like interconnected to CPU 124 through bus 122. A display 140, 144, 148 is interconnected with CPU 124 through bus 122 for providing a software GUI or a website depicting appointment results outputted by the intelligent conversation-based appointment tool. Terminal 118 can further include a program instruction 128 stored in memory 126, such as a driver enabling terminal 118 to interconnect with server 102 through network 120.

When the operator, or multiple operators, input information into memory 108 via terminals 118, 142, and/or 146, the server 102 applies the input to a verb/noun rule processor 112 to create and/or update a request dimension. The operator input is either in natural language, database query or the like. The server 102 executes a query on scheduling database 110 based on the request dimension created by verb/noun rule processor 112 to find available appointment blocks.

It is contemplated by the present invention that scheduling database 110 utilizes SQL Server®, a data-centric object-oriented and procedural programming language available from Microsoft Corporation of Redmond, Wash. Of course one skilled in the art will recognize that the techniques of the present invention can be implemented utilizing other software systems and on other databases using other fields without departing from the spirit of the present invention. Furthermore scheduling database 110 may store the scheduling data over one or more databases.

The response from scheduling database 110 is stored in memory 108 as a response dimension 114 that organizes the display of available appointments in a manner that provides context of the operator's intent. For example if an operator inputs "haircut tomorrow" via terminals 118, 142, and/or 146, the response dimension is organized such that when appointment results are displayed on display 140, 144, 148 of terminals 118, 142, and/or 146, a header is populated as "haircut" followed by subsections representing the employee or employees that can perform the service. This differs from traditional scheduling systems whereby the days of the week represent the header information, followed by subsections representing employees available to perform haircuts. It is also contemplated by the present invention that in addition to, or in lieu of the word "haircut," the header information can be a graphical depiction, such as scissors or a buzzer to represent haircut and a picture of the employee that can perform the service. In alternative embodiments, the header information is the name of the employee(s) qualified to provide haircuts with each employee's available days underneath. In various embodiments of the present invention, the view displayed on display 140, 144, 148 of terminals 118, 142, and/or 146 is dynamically generated from the response dimension, rather than written into a computer program. In this instance, the server 102 transmits the response dimension 114 through network 120 to terminals 118, 142, and/or 146 to display the available appointment blocks for the operator to view and select on display 140, 144, 148. The verb/noun rule processor 112, request dimension, and response dimension 114 is described in greater detail below.

Figure 2A:
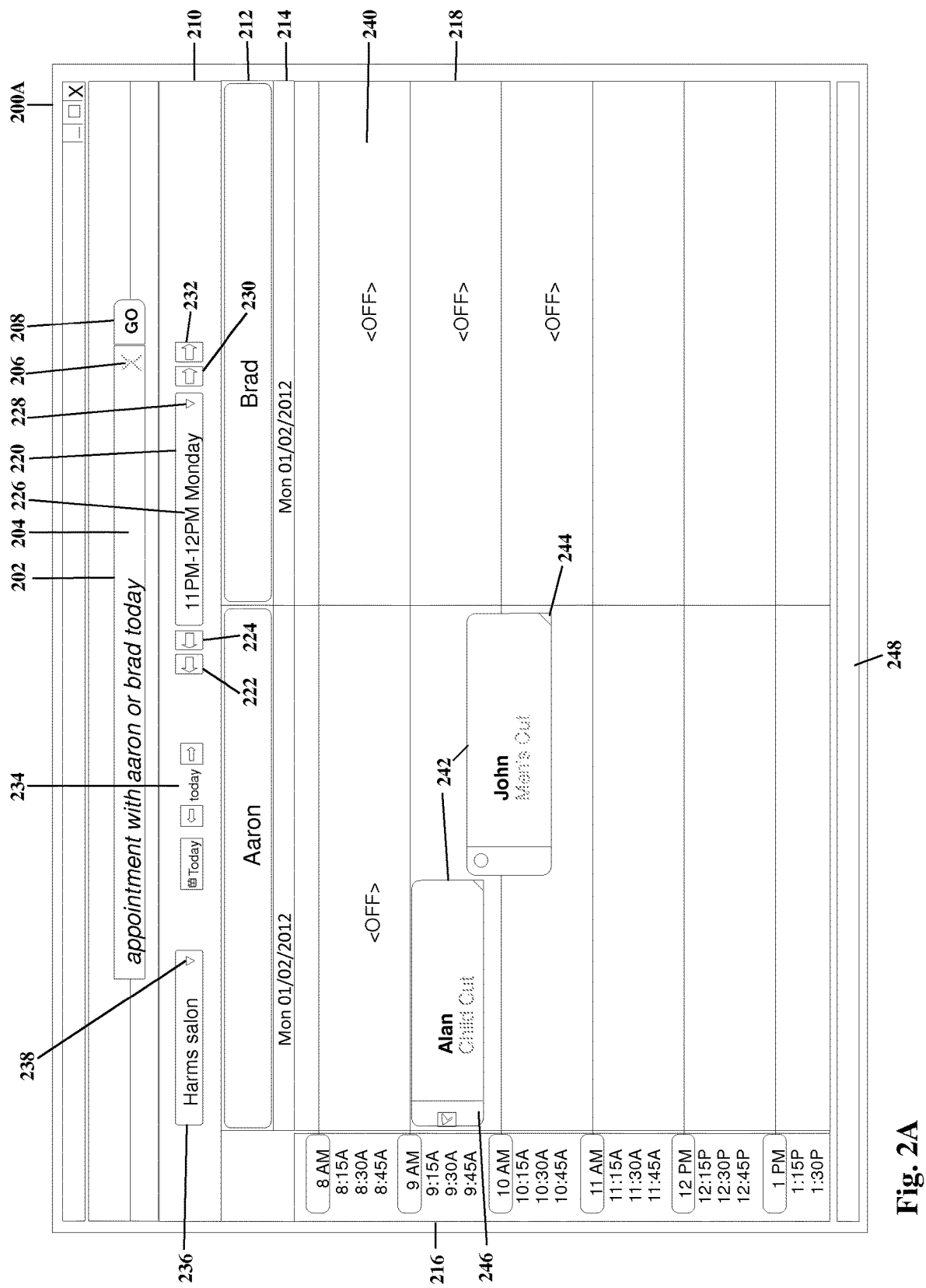
FIG. 2A is a screen diagram showing an application interface in accordance with various embodiments of the present invention.
Figure 2B:
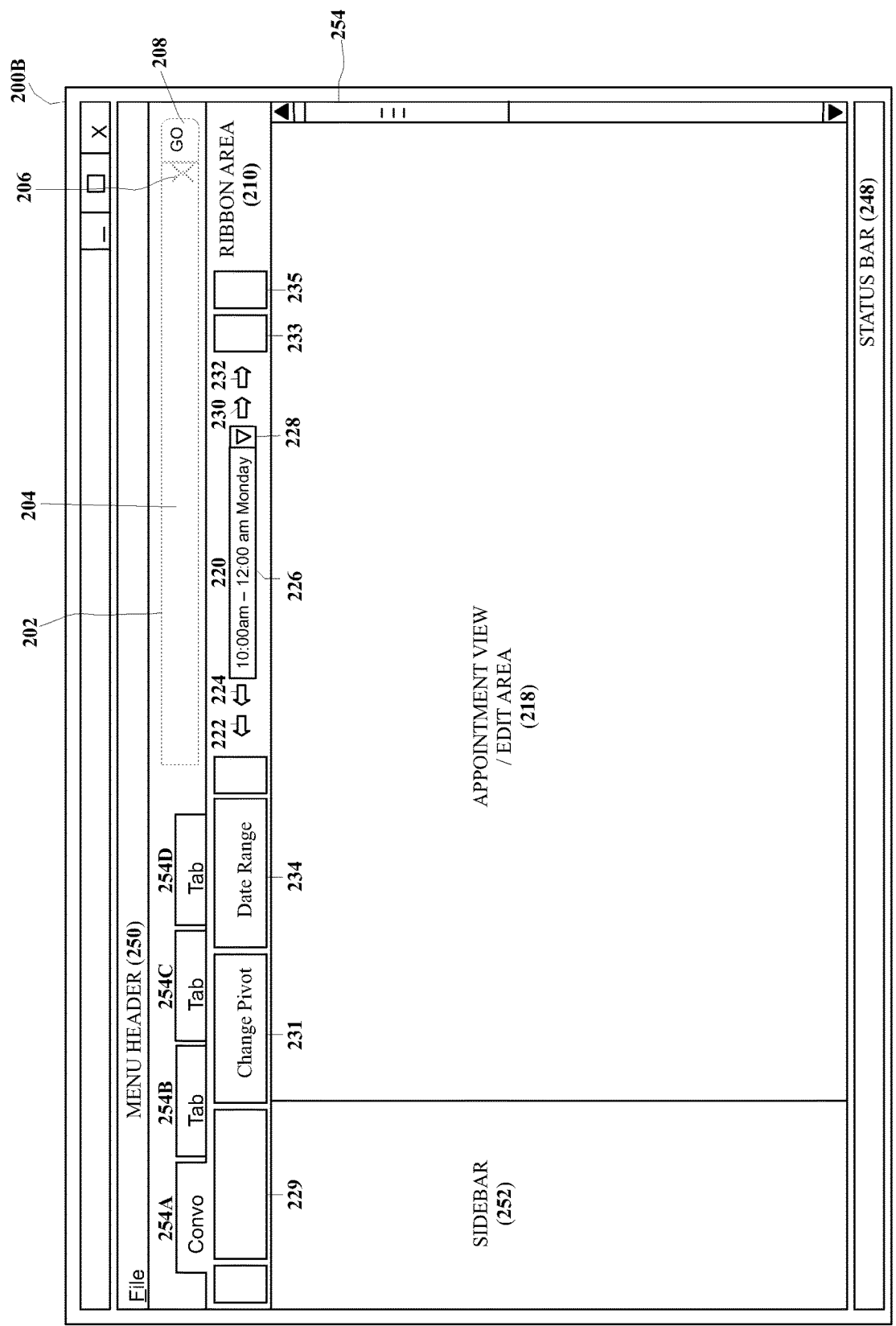
FIG. 2B is a screen diagram showing an application interface utilizing tabs in accordance with various embodiments of the present invention.
Figure 3A:
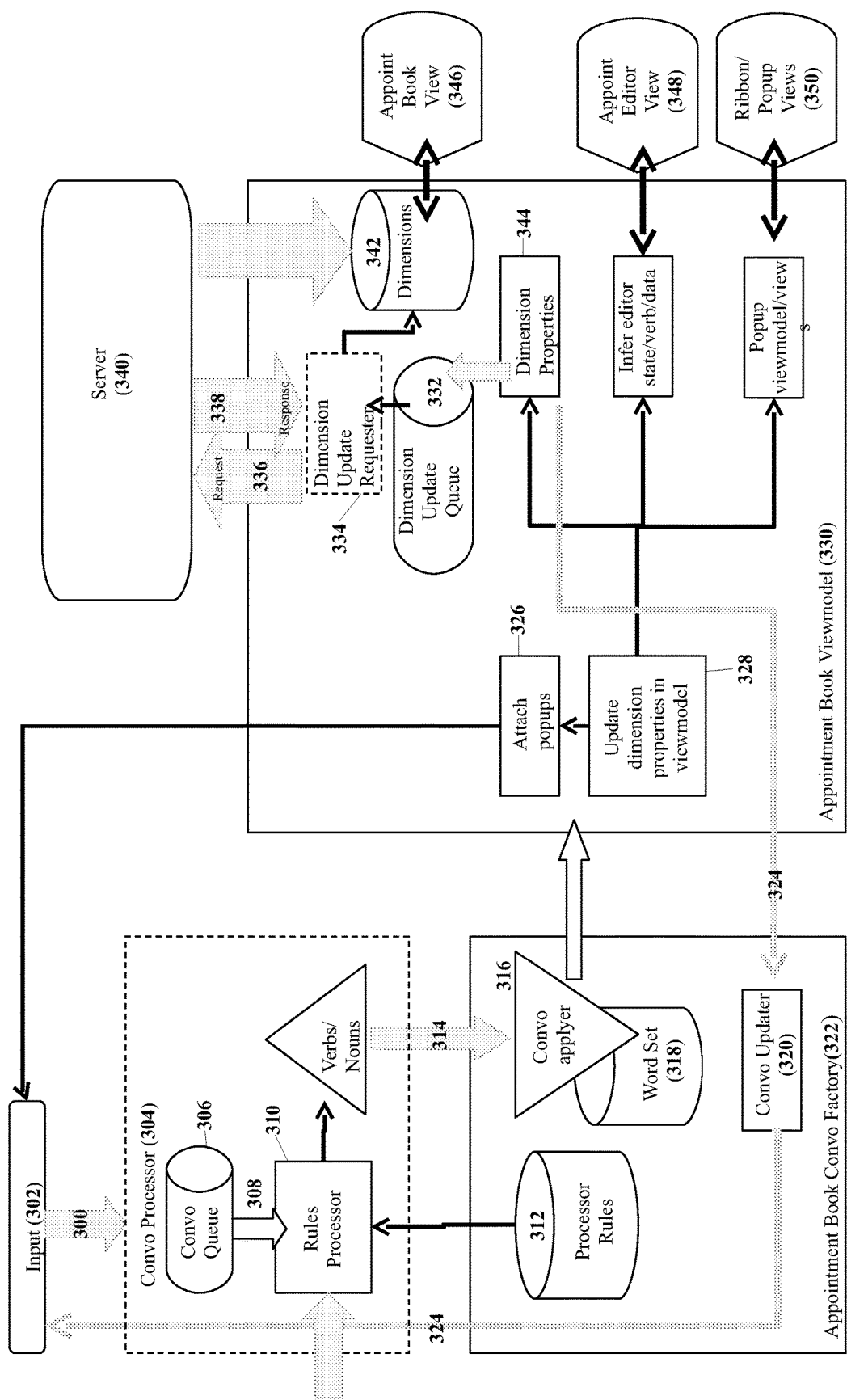
FIG. 3A is a data flow interaction diagram depicting a multi-threaded architecture for implementing the intelligent conversation-based appointment tool, according to the present invention.

It is contemplated by the present invention that a Model-View-ViewModel (MVVM) user interface ("UI") design pattern can be utilized to separate application UI elements described in FIGS. 2A, and 2B from the program logic described in FIG. 3A. The MVVM design pattern can take advantage of the databinding features of the Windows Presentation Foundation ("WPF") to establish a connection between the application UI elements and program logic. Of course one skilled in the art will recognize that the techniques of the present invention can be implemented utilizing other design patterns and software without departing from the spirit of the present invention.

FIG. 2A depicts a screen diagram showing an exemplary application UI window generated by the present invention. Screen display 200A is presented on a terminal (such as terminal 118, as shown in FIG. 1) for viewing by an operator charged with populating the intelligent conversation-based appointment tool based on customer inputs provided orally to the operator or electronically to automated intelligent attendant. As shown in FIG. 2A, screen display 200A comprises of various application UI elements including operator input 202, ribbon area 210, header area 212, time bar 216, date bar 214, and appointment view/editing area 218.

Operator input 202 comprises operator selectable interface controls, including a text entry field 204, clear button 206 and submit button 208. The operator of the intelligent conversation-based tool enters a search using the natural language provided by a customer (i.e., the language spoken by the customer) into text entry field 204. When the operator has completed inputting a search the operator selects submit button 208, thereby inputting the terms in text entry field 204 to input 302 of the intelligent conversation-based appointment tool's program logic, thereby initiating a search (the processing of which is discussed with respect to FIG. 3). It is contemplated in the present invention that data-binding offered by WPF is utilized to connect the application UI element text entry field 204 to input 304 of the program logic. Of course one skilled in the art will recognize that the techniques of the present invention can be implemented utilizing other design patterns without departing from the spirit of the present invention. Alternatively, the operator may override the search and use clear button 206 to clear the text entry field 204.

The ribbon area 210 is used to display various operator selectable interface controls. Exemplary interface controls accessible from ribbon area 210 include, but are not limited to, service provider control 236, date range selector 234, and suggestions control 220.

Service provider control 236 allows the operator of the intelligent conversation-based tool to select which service provider system to utilize when searching for an appointment. This is particularly advantageous in a situation where various service providers rely on a third-party to set up appointments for customers. Service provider control 236 allows third-party appointment providers to select from drop-down 238 of service control 236 the corresponding service provider that a customer is attempting to schedule an appointment with. As a result, the third-party appointment provider operator can execute a single instance of the intelligent conversation-based appointment tool, instead of switching between various application windows. In one embodiment the name of the service provider may be entered into operator input 202, allowing the intelligent conversation-based appointment tool to determine the applicable service provider for the search. A service provider that provides several distinct services can also utilize service provider control 236. For example, the service provider control 236 may be utilized by a hospital providing various healthcare solutions to facilitate organizing the information of various services in appointment view/edit area 218.

Header area 212 displays information related to the search results based on operator input 202. In various embodiments of the present invention, the elements of header area 202 are dynamically generated from a response dimension (described in further detail in FIG. 11), rather than written into a computer program. As is further described herein, the information displayed in header area 202 is determined by the natural language operator input 202 entry.

Date area 214 displays information related to the date that an appointment is available. In various embodiments, date area 214 is dynamically generated based on the natural language operator input 202 entry. In addition, information displayed in date area 214 can dynamically change in response to a change in operator input 202 or date range selector 234. In the present embodiment as shown in FIG. 2A, the date area 214 is located directly below ribbon area 210; however, the position of date area 214 is configurable using either an operator selectable interface control, setting a configuration flag, or other similar configuration tool.

As shown, time bar 216 is positioned adjacent to appointment view/edit area 214. Time bar 216 utilizes a 12-hour format, with 15 minute increments between each hour; however, other formats for configuring time such as a 24-hour time format and other increments of time can be used with the present invention. Time area 216 can be generated dynamically in response to the natural language input of operator input 202. For example, an operator input 202 of "appointment with Aaron or Brad this morning" would limit the times displayed in time area 216 to 9:00 am until 12:00 pm, reflecting the morning hours of a service provider.

The appointment view/edit area 218 of FIG. 2A includes one or more appointment blocks 240. The number of appointment blocks 240 accessible in the operator's viewable area can dynamically depend on the natural language input of operator input 202 and/or a scale tool (not shown). Furthermore, in one embodiment of the present invention utilizing a touch screen based computer system, the operator can change the number of appointment blocks 240 in the viewable area through electrical currents based on the operator's touch. One or more appointment elements 242 is placed on one or more appointment blocks 240. Appointment block 240 can have one or more properties applied to it, including but not limited to, non-working time, free time, constrained time (e.g., business development block, training block, etc.), other activity time and business hours non-working. Each property has an associated priority to determine the behavior of appointment block 240 when a multiplicity of properties are applied to appointment block 240. For example, an appointment block 240 with the property non-working time is considered outside of the service providers standard hours of operation or that the specific employee, resource or equipment is not to be scheduled at that time. Furthermore, non-working time may indicate an employee that is on vacation, sick, or on leave for business or personal matters. In one embodiment an employee that is non-working due to personal matters can have information for the reason displayed on appointment block 240. In various embodiments visually displaying a non-working appointment block 240 can be indicated by darkening the time period.

As shown in FIG. 2A, the term "<OFF>" is used as an exemplary visual indicator that an appointment block 240 is non-working time. Of course, the appointment blocks 240 can have certain inherent limitations which allow for easy interaction with the system by the operator. For example, appointment element 242 can be a dragable element in appointment view/edit area 218, however, an appointment element 242 may not be dragged to encompass appointment blocks 240 with the non-working time property. Moreover, a recently created or updated appointment element 242 may not be dropped on a non-working appointment block 240.

In various embodiments, an appointment block 240 with a free time property represents a working time that is available for booking. In an embodiment where an appointment block 240 can have various properties, the free time property can have the lowest priority. Accordingly, it is only shown if no other appointment element 242 or property is located on appointment block 240. In one embodiment, a visual indicator for a free-time appointment block 240 is a white background. Furthermore, when an operator moves a cursor over an appointment block 240 a tool-tip can pop-up with further information about the available appointment block 240. Appointment element 242 can be dragged or dropped onto free-time appointment block 240.

In one embodiment of the present invention an appointment block 240 is configured as constrained. The constrained appointment block 240 is unavailable for placing appointment elements 242 due to limited resources. For example, an appointment block may be constrained if a service provider only has two hot rock sets, and both are in use at a given time. The appointment block 240 during the period of time that both hot rock sets are in use will appear constrained for an appointment element 242 that requires hot rocks. In one embodiment, the constraint property can be overcome by re-scheduling or editing appointment element 242 so that the conflict is no longer present. When the operator places a cursor over an appointment block 240 with a constraint, a tool tip can pop-up with rationale for the revised constraint, such as for example "Not enough hot rocks." In one embodiment, selecting the constrained appointment block 240 allows the operator to quickly locate the appointment elements 242 that are causing the constraint to appear at appointment block 240. The operator can subsequently determine whether those appointment elements 242 can be revised and/or rescheduled.

In an exemplary embodiment, an appointment block 240 can be configured with a business hour non-working time property. As a result, appointment block 240 would be displayed as unavailable. An example of business hours non-working times is a team meeting. In one embodiment the visual indicator of a business hours non-working appointment block 240 is a dark gray background. Furthermore, when the operator moves a cursor over the business hours non-working time, a tool tip will pop-up with information on the activity. Selecting a non-business working appointment block 240 allows the operator to change the property of the appointment block 240. Furthermore, the operator can drag an appointment element 242 onto a business hours non-working appointment block 240. As a result, the appointment block 240 is in conflict. Personnel of the service provider can determine whether to honor the appointment or not.

When appointment block 240 is configured to other activities, this relates to activities for an employee, resource, or equipment. Examples of of activities include "team huddles" or "cleaning" In one embodiment, the visual indicator of an other activities appointment block 240 is a dark gray background. When an operator places a cursor over the other activities appointment block 240, a tool tip can pop up with a reason and description. In one embodiment, the operator can select other activity appointment block 240 and edit or change the activity. Furthermore, the operator is capable of dropping an appointment element 242 on an other activity appointment block 240. As such, the appointment block 240 is in conflict whereby personnel of the service provider can resolve at a later time.

Appointment element 242 contains the details of an existing appointment. In an embodiment where an appointment block 240 can have one or more properties attached, an appointment element 242 has the highest priority and shows over other properties. The visual appearance of appointment element 242 can include a tab 244 and stripe 246. Tab 244 and stripe 246 provide visual indicators for an operator to quickly determine information about an appointment without selecting appointment element 242 for further details. For example, tab 244 can include a border color or indicator to represent that the appointment was booked by phone, online, or automatically as a result of a previous appointment. Stripe 250 can be colored to represent the confirmation state of the appointment element, which can include, without limitation, auto-confirmed, SMS confirmation sent, e-mail confirmation sent, or confirmed via cell phone. Furthermore, stripe 246 can indicate the state of the appointment booking such as whether the customer is running late, the customer did not show up, the customer is unconfirmed, or that the customer has checked in. The background color of appointment element 242 can also reflect information on the service type. For example, all appointment elements 242 for a haircut can have a teal background. When the operator moves a cursor over appointment element 242, a tool-tip can pop up with the details of the appointment along with a list of actionable commands such as reschedule, cancel, edit, check, and the like depending on the state of appointment element 242. When an appointment element 242 is set to an edit or reschedule mode the appointment element 242 can be dragged to other available or conflicting appointment block 240. A plurality of appointment elements 242 can be dropped in a single appointment block 240, allowing a service provider to double book. A personnel member from the service provider may resolve the conflict. In one embodiment, the intelligent conversation-based appointment tool can make a suggestion for resolving the conflict by examining the circumstances of the double booking including, but not limited to, information of past appointments by the customers involved in the conflict, the employee or employees involved, and the service. For example, the intelligent conversation-based system can suggest allowing a double booking in a situation where the customer and employee providing the service are the same for both appointment elements 242.

FIG. 2B is a screen diagram showing an application UI interface utilizing tabs in accordance with various embodiments of the present invention. Screen display 200B depicts an application window generated by the intelligent conversation-based tool and presented to an operator of the intelligent conversation-based tool on a terminal (such as terminal 118, as shown in FIG. 1). The application window includes tabs 254A, 254B, 254C, and 254D, operator input 202, ribbon area 210, an appointment view/editing area 218, and sidebar 252.

Operator input 202 comprises operator selectable interface controls, including at least a text entry field 204, clear button 206 and submit button 208. The operator of the intelligent conversation-based tool enters a search using the natural language provided by a customer (i.e., the language spoken by the customer) into text entry field 204. When the operator has completed inputting a search, the operator selects submit button 208, thereby transferring the terms in text entry field 204 to input 302 of the intelligent conversation-based appointment tool to initiate a search (discussed in further detail with respect to FIG. 3). Alternatively, the operator may override the search and use clear button 206 to clear text entry field 204.

The ribbon area 210 is used to display operator selectable interface controls. While numerous tabs 254A, 254B, 254C, and 254D are depicted in the figure, in the present display, tab 254A has been selected and related information is populated on the screen for viewing by the operator. As shown, exemplary interface controls that are accessible from ribbon area 210 of tab 254A include, but are not limited to, change verb control 229, change pivot control 231, order date control 233, date range selector 234, change filter control 235, and suggestions control 220. In various embodiments operator input 202 is updated to reflect changes made by the various operator selectable interface controls located on ribbon area 210. In addition, changes in operator input 202 can be reflected in the various operator selectable interface controls on ribbon area 210. In various embodiments, the operator selectable interface controls can be located anywhere on screen display 200B either in a fixed or movable location. The available operator selectable interface controls can also be dynamically generated in response to operator input 202.

The change verb controller 229 allows the operator to add, change, cancel, reschedule, or check in for an appointment. In addition, the operator can indicate that a customer is running late to an appointment. Therefore, the intelligent conversation-based appointment tool of the present invention can consider whether to modify the appointment or take other actions such as notifying the employee providing the service, delaying subsequent appointments, notifying other customers affected by the delay, etc. Of course, other similar options may appear in change verb controller 229.

Changing pivot 231 allows the operator to prioritize an aspect of the appointment search request for determining and displaying available time slots. Examples of fields that can be set as the pivot include, but are not limited to, inferred, by employee, by resource and by equipment. Setting pivot to inferred allows the system to determine what the operator intends to pivot on, based on the input terms. For example, the conversation-based appointment tool can take into context conventional customs and practices of scheduling in a service provider's business to determine the appropriate pivot. For example, in the search "haircut with Kelly in room 1" the system can be configured to pivot the results on employee "Kelly" and resource "room 1." For a service provider that primarily books appointments based on rooms, the service provider can configure availability based on resource, i.e., room 1.

The order date control 233 allows the operator to determine the position of the date bar, which is not shown, in appointment view/edit area 218. The date bar can be configured as either root, whereby the date bar is positioned before the header bar, which is not shown, or leaf, whereby the date bar is positioned after the header bar in the appointment view/edit area 218.

Suggestions control 226 allows the operator to cycle through the available appointment dates after a search is complete. In one embodiment various arrow buttons allow the operator to cycle through the last suggestion of the previous day 222, previous suggestion 224, current suggestion 226, next suggestion 230, and first suggestion on the next day 232. The option to see a list of all the suggestions 228 is provided for by the system.

Furthermore, date range selector 234 allows the operator to determine the span of time to search for available appointments. In one embodiment, the start time can be set using natural language such as: today, tomorrow, this week, this weekend, next weekend or this month. To change both the start date and end date, the date range selector 234 can allow the following terms: move range forward one day, move range backward one day, open range by one day, or close range by one day. In another embodiment, the date range selector 234 can use a calendar control known in the art for determining the start and end date range.

Change filter control 235 allows the operator to add filters to the appointment results. In one embodiment of the present invention, change filter control 235 allows the additional filtering by employee, resource, or equipment, thereby allowing the operator to remove information that they deem as extraneous from their view.

The tabs 280A-280D are operator selectable interface controls which, when selected, cause different controls to be displayed in ribbon area 210. For example, the various operator selectable interface controls described above may be grouped and displayed only when a corresponding tab is selected. As a result, the operator selectable interface controls on screen 200B can be organized to reduced clutter.

In one implementation, each tab 280A-280D represents a search result, whereby the operator may quickly select and view the results without inputting the search again. Sidebar 252 displays information on a history trail of the searches that the operator has performed either using operator input 210 or through operator selectable interface controls on ribbon area 210. When the operator selects a previous search in the history trail, the intelligent conversation-based appointment tool subsequently performs the search again. Sidebar 210 may also be used to display other information to the operator and display additional operator selectable interface controls.

Upon accessing tab 280A-280D, scroll bar 254 is displayed adjacent to appointment view/edit area 218. Vertical scroll bar 254 allows for the scrolling of the contents of the appointment view/edit area 284; however, tabs 280A-280D and ribbon area 210 remain in an unaltered form on the screen. As a result, the operator has access to the operator selectable interface control located on ribbon area 210, while examining available appointments.

It is contemplated by the present invention that the functions of the operator selectable interface controls can be available through menus located on menu header 250 of screen display 200B. In one embodiment, ribbon area 210, sidebar 252, and tabs 280A-280D are not present, thereby menu items located on menu header 250 are the only additional means for editing a search without using operator input 202. As a result, the viewable area of appointment view/edit area 284 is increased for the operator to determine an applicable appointment time slot.

Status bar 248 can be used to display information such as total available appointment blocks and total search time to indicate the efficiency of the intelligent conversation-based appointment tool. This data can be stored by the intelligent conversation-based appointment tool for making suggestions to improve the operator's efficiency.

Referring now to FIG. 3A, depicted is a simplified block diagram of the interaction data flow of the preferred embodiment of the present invention. Although this exemplary embodiment utilizes a MVVM design pattern, one skilled in the art may apply the following techniques to other UI design patterns. Moreover, although the block diagram illustrates a multi-threaded application of the present invention, one skilled in the art may take the techniques disclosed and apply to a single threaded data flow. When an operator completes entering data into operator input 202 (such as shown in the application UI of FIG. 2) and presses submit button 208, the search is transferred to input 302. Input 302 into the intelligent conversation-based appointment tool can either be textual, as described in detail in FIG. 4, or from a speech or auditory signal as described in detail in FIG. 5. A program thread 300 places the input 302 into convo queue 306. In the present embodiment, convo queue 306 is configured as First In First Out (FIFO). One skilled in the art will understand that other configurations of a queue can be used provided that they maintain the ordering information of input 302. Furthermore, in one embodiment, rules processor 310 pulls an entry from convo queue 306 every 100 ms through thread 308. An entry that is pulled by rules processor 310 from convo queue 306 is split into verbs and nouns based on processor rule 312 (a process which is described in further detail in FIG. 5 wherein the rules processor 310 splits an entry from convo queue 306 into verbs and nouns). The entry pulled by rules processor 310 from convo queue 306 is compared to branching rules to determine whether it is a verb or noun. Each verb/noun that is determined by the rules processor 310 raises an event on thread 314 for convo applyer 316 to generate a request dimension utilizing word set 318 based on the verb/noun (FIGS. 11, 12, 13, and 14 describe exemplary examples of request dimensions created by convo applyer 316 in response to a natural language input in input 302).

Convo applyer 316 applies request dimension to the dimension update queue 332 in the appointment book view model 330. As described, the dimension update queue 332 is configured as First In First Out (FIFO). One skilled in the art would understand that other configurations of a queue may be used provided that they maintain the ordering information of input 302. When convo applyer 316 applies the request dimension to the appointment book view-model 330, the dimension update requester 334 pulls an entry from dimension update queue 332. Dimension update requester 334 converts the request dimension into a database query.

The dimension update requester 334 communicates with server 340 through dimension request thread 336 and dimension response thread 338. The server sends a response query to the request query from the dimension update requester 334 through dimension response thread 338 to the dimension update requester 334. The dimension update requester 334 converts the response query into a response dimension that is applied to dimensions 342 of the appointment book view-model 330. Appointment book view 346 utilizes dimensions 342 to display to the operator (such as in appointment view/edit area 218 described in FIG. 2A), to the operator available appointments prioritized by input 302. In addition, when the appointment book view-model 346 updates dimension properties 344, pop-ups 326 are attached to the terms in input 302 that determined the request dimension. The pop-ups 326 can give suggestions to the operator of other options that are available for a search. For example, for the input "haircut tomorrow," the terms "haircut" and "tomorrow" would have a pop-up appear once the operator places a cursor over the term. For the term "haircut" the pop-up can suggest other services offered such as massage, while the pop-up for the term "tomorrow" can suggest other days that a haircut is available. Further examples of pop-up displays are described throughout the disclosure, such as a pop-up 346 set forth in FIG. 3B. For example, a pop-up 346 is attached to the term "Friday" in a search for "appointment with John or Andrew tomorrow or Friday." In addition, FIG. 3C illustrates a pop-up 346 attached to the term "haircut" in a search for "haircut with John or Andrew tomorrow or Friday." In various embodiments of the present invention that utilize a touch-screen computer-based system, the operator taps on highlighted terms to display underlying pop-up elements.

It is contemplated by the present invention that the operator can use ribbon UI elements 350 to input and/or change the fields of a request for an appointment instead of using input 302. In at least one embodiment, some of the elements of the UI are dynamically generated from the input 302, rather than written into a computer program. For example, if input 302 is "Only Kelly," the ribbon UI 302 would not include a control for changing the name of the employee. Ribbon area 210, as shown in FIG. 2A and FIG. 2B, illustrates exemplary ribbon UI elements of the present invention.

Rules processor 310 determines from the context of the conversation whether the conversation is a new appointment based on the verbs, and pre-populates the known values based on the nouns for confirming the appointment. In an embodiment of the present invention, an account log-in function can be provided. Once a customer is identified, the system can access and evaluate the customer's information for various purposes, including to determine whether the appointment is new. For example, if a customer logs into the system and has already scheduled a haircut for the next day, when the customer requests "Haircut today instead," the intelligent conversation-based appointment tool accesses the stored information about the customer's existing appointment. Further analysis of the customer's existing appointment can be logically considered. For example, if the customer's existing appointment was for a "haircut with Kelly tomorrow," the re-scheduling search of "Haircut today instead" would be interpreted by the intelligent conversation-based appointment tool as "Haircut today with Kelly."

The operator can input into the intelligent conversation-based appointment tool various parameters including the customer's name, contact telephone number, and/or other distinguishing characteristics when requesting an appointment and the intelligent conversation-based appointment tool can query the scheduling database for an individual with similar characteristics in the system.

In addition, the rules processor 310 can infer from the verbs used in the conversation that the intent is to alter, reschedule, or cancel an appointment based on input 302 and pre-populate the known values to change, reschedule, or cancel an appointment. For example the phrases "change appointment," "reschedule," or similar phrases will initiate the intelligent conversation-based appointment tool to query the requested appointment in order to allow the operator to make modifications.

The rules processor 310 can also access a time service to determine the date based on natural language. For example, assuming that the current date is January 1, the time service can be used to determine that the phrase "the day after tomorrow," means January 3 when searching for available appointment blocks.

The dimension update queue 332 can have changes pushed using traditional UI elements located in appointment book view 346, appointment editor view 348, and ribbon/popup view 350 such as buttons, radio buttons, and drop-downs that represent configurable properties. When there is a change in a dimension property 344 in appointment book view-model 330, convo updater 320 updates input 302 to reflect the change in the property. For example, if input 302 is "haircut tomorrow," the intelligent conversation-based appointment tool conducts its search based on a "tomorrow" date range. Alternatively, if the operator uses a date range picker control to change the date range to next week, input 302 dynamically changes to "hair cut next week" and a new request dimension reflecting this requirement is sent to the dimension update queue 332.

Figure 3B:
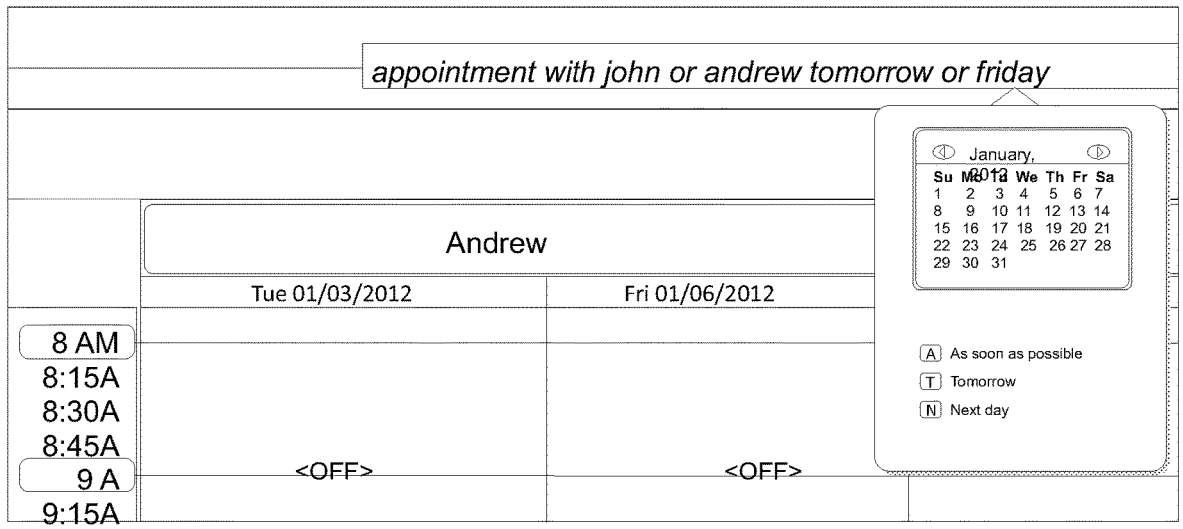
FIG. 3B is a screen diagram depicting the intelligent conversation-based appointment tool attaching pop-ups based on a natural language input.
Figure 3C:
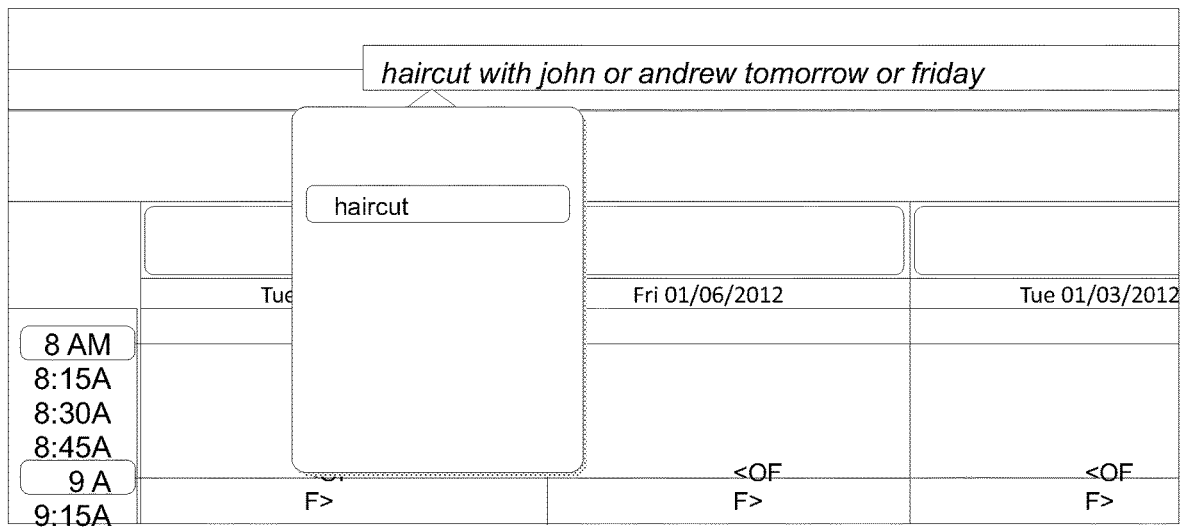
FIG. 3C is a further example of a screen diagram illustrating the intelligent conversation-based appointment tool attaching pop-ups based on natural language input

FIG. 3B is a screen diagram depicting the intelligent conversation-based appointment tool attaching pop-ups based on a natural language input, as described in FIG. 3A. In the present embodiment, pop-ups are available for terms that the intelligent conversation-based appointment tool used to determine the search results. As shown in FIG. 3B, a pop is available for the term "Friday." Assuming that the current day is Monday, Jan. 1, 2012, the term "Friday" was used for the search, because Friday, Jan. 6, 2012 appears in the results. The pop-up attached to the term "Friday" can use a calendar tool or shortcuts to find another day for an appointment. In one embodiment of the present invention that utilizes a touch-screen computer-based system, the operator taps on highlighted terms to display pop-ups.

FIG. 3C is a further example of a screen diagram illustrating the intelligent conversation-based appointment tool attaching pop-ups based on natural language input, as described in FIG. 3A. In this example, a pop is available for the term "haircut." The pop-up attached to the term "haircut" can provide a list of other services that the service provider has available during the requested days and times. In an embodiment of the present invention with an account log-in function, the intelligent conversation-based appointment system can tailor the suggestions to services based on various customer data. For example, shampooing can be suggested to be double booked with haircut, if an aggregate of customers employ both services together. Furthermore, the intelligent conversation-based appointment tool can make suggestions based on services performed by the employee or employees named in the search.

Figure 4:
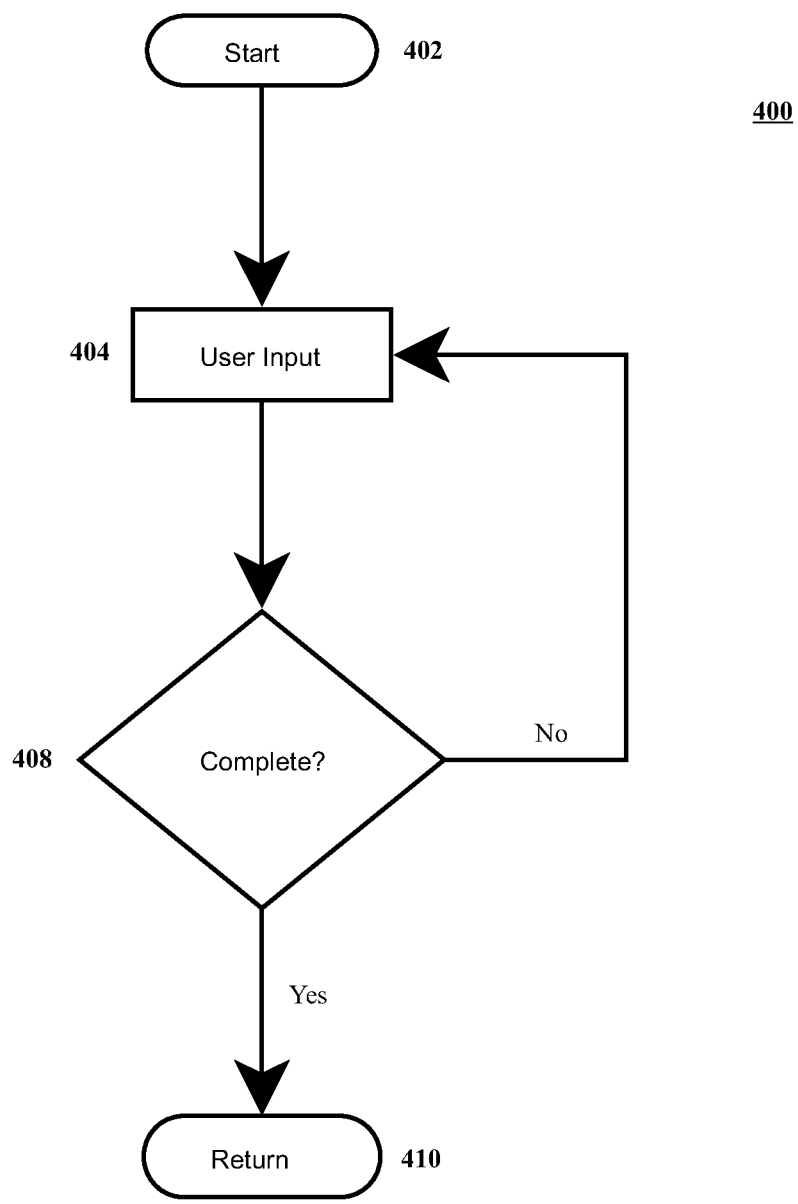
FIG. 4 is a flowchart depicting the text input procedure in accordance with the present invention.

FIG. 4 is a flowchart 400 illustrating a method of finding available appointment blocks using textual natural language, in accordance with the preferred embodiment of the disclosure. The textual input procedure begins at block 402.

In the present example, the intelligent conversation-based appointment tool receives textual data input from a terminal through a network at block 404. The data, which is provided by a customer, is inputted by an operator manually or electronically. At block 406, the server waits for notification that the input is complete before processing a search. The notification can either be transmitted from the terminal communicating with the server, or after a predetermined period of time since the addition or removal of data has been transmitted to the server. A terminal can transmit a completion notification when submit button 208, as shown in FIG. 2A, is selected by the operator. A completed input is returned for further processing by the intelligent conversation-based appointment at block 408.

In an embodiment of the present invention, a customer or operator is accessing the conversation-based appointment tool in a cloud-computing environment, and therefore operating the intelligent conversation-based appointment tool on the server. As the customer or operator enters text into the input field, search terms are immediately processed by the server in a loop fashion, until a specific appointment is established. As described in FIG. 3A, the entry of data results in the population of the headers used for organizing the display of the results from the server. Such headers and sub-headers are displayed until the operator or customer completes the textual entry of data. For example when an operator inputs "Kelly for a haircut," the header "Kelly" will appear on completion of the term "Kelly." After "haircut" is inputted by the operator, the sub-header "haircut" will appear below header "Kelly." Finally, after the server returns the results of available appointment blocks, the date and time information populate the display.

Figure 5:
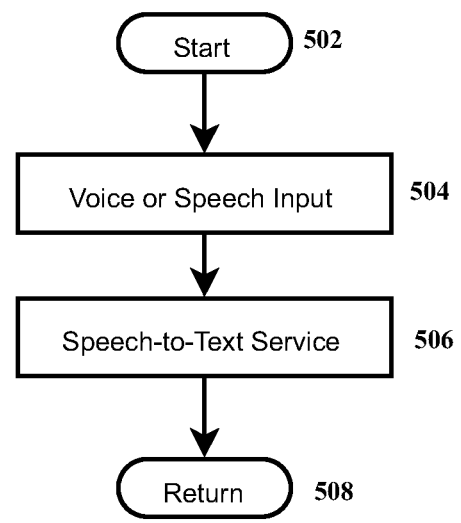
FIG. 5 is a flowchart of the speech input procedure in accordance with the present invention.

As mentioned, data input may be accomplished automatically through the use of speech recognition software common in the art. This method of input is presented in more detail in FIG. 5. Referring to FIG. 5, presented is a flow chart of the speech input procedure 500 for the conversation-based appointment tool of the present invention, starting at block 502.

The intelligent conversation-based appointment tool of the present invention receives voice or speech input in the form of an auditory signal at block 502. A speech-to-text service or processor generates a textual interpretation of the auditory speech or voice at block 506. While it is contemplated by the present invention that Dragon Speech by Nuance Corporation of Burlington, Mass. is implemented as the speech-to-text service, it will be readily recognized by one of ordinary skill in the art that various speech-to-text conversions can be employed without departing from the spirit of the present invention. The speech interpretation is returned to the intelligent conversation-based appointment tool for further processing at block 508. It is contemplated by the present invention, that in at least one embodiment, the customer or the operator can be provided an interface whereby data can be inputted interchangeably as text or speech auditory input before sending the input to the intelligent conversation-based appointment tool of the present invention for further processing.

Figure 6:
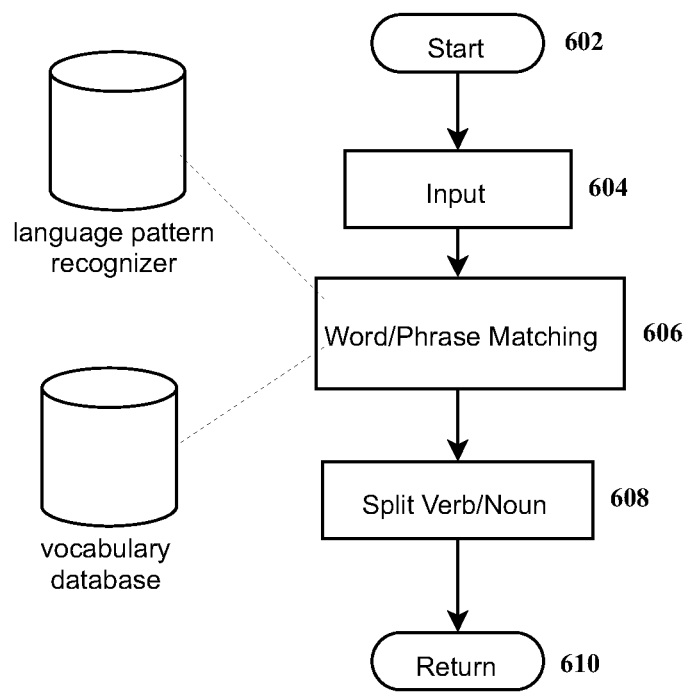
FIG. 6 is a flowchart of the verb/noun processing procedure in accordance with the present invention.

As part of the processing of the inputted data, the data is analyzed based on a series of verb/noun processing criteria. FIG. 6 is a flowchart of the verb/noun processing procedure 600 which begins at block 602. Natural language is captured either textually, through speech or auditory signals, or any combination thereof, and is inputted into the verb/noun processor, as described in FIG. 3A, at block 604. At block 606 the input is parsed for word/phrase matching. The word/phrase matching block 606 accesses a vocabulary database and language pattern recognizer to convert the natural language into nouns and verbs at block 608. The split verbs/nouns are returned to the intelligent conversation-based appointment tool for further processing at block 610. Throughout the verb/noun processing procedure 600, the order in which the natural language was inputted is maintained.

Figure 7:
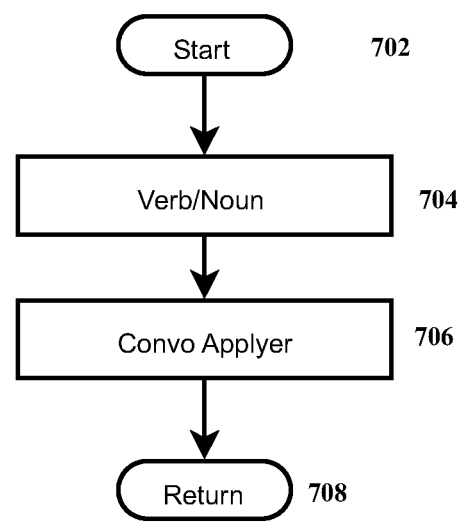
FIG. 7 is a flowchart of the procedure for creating a request dimension in accordance with the present invention.

Continuing the processing of inputted data, a request dimension is created. Referring next to FIG. 7, a flowchart is presented depicting the procedure for creating a request dimension. The procedure begins at block 702. The verbs/nouns that were processed according to the verb/noun processing criteria set forth in FIG. 6 are culled and inputted into the conversation-based appointment tool at block 704. The convo applyer, as described in FIG. 3A, at block 706 uses the verbs/nouns to create a request dimension for querying available appointment blocks. This involves the process of converting the verbs/nouns of the natural language to a query that a database can understand. The request dimension can be an object whereby object relational mapping techniques are utilized to query the database (described in further detail with respect to FIG. 11). At block 708 the request dimension is returned.

The conversation-based appointment tool returns a response dimension in response to the request dimension. The response dimension directs an application UI, such as described in FIG. 2A, to display the information in the priority of the natural language inputted into the system as previously described. Of course, in certain situations the priority of the natural language may be overridden by configurations in the intelligent conversation-based appointment.

Figure 8:
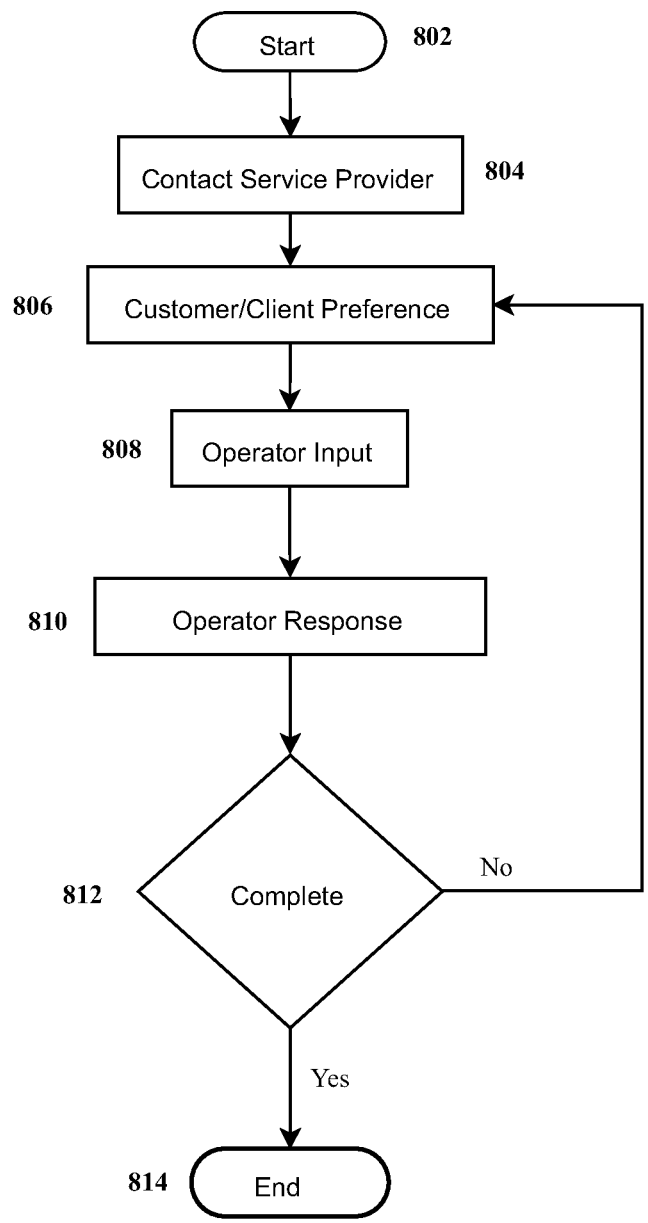
FIG. 8 is a flowchart of the procedure in which the operator interacts with the intelligent conversation-based appointment tool to schedule an appointment in accordance with the present invention.

FIG. 8 is a flowchart depicting the customer interaction with an operator interfacing with the conversation-based appointment tool to schedule an appointment, starting at block 802. The customer contacts the service provider using various networks such the Internet or telephone and is connected to a human operator, automated operator/attendant, or the like. The customer relays to the operator of the service provider's system the preferences of the requested appointment. The operator inputs the preference, block 806, using natural language into the intelligent conversation-based appointment tool, which returns results organized by the natural language input. The operator relays the available appointment blocks to the customer at block 810. The customer can accept one of the available appointment blocks, thereby ending the procedure at block 814, or reject the available appointment blocks, thereby looping the request for alternate or clarifying questions at block 806 in order to modify the search.

Figure 9A:
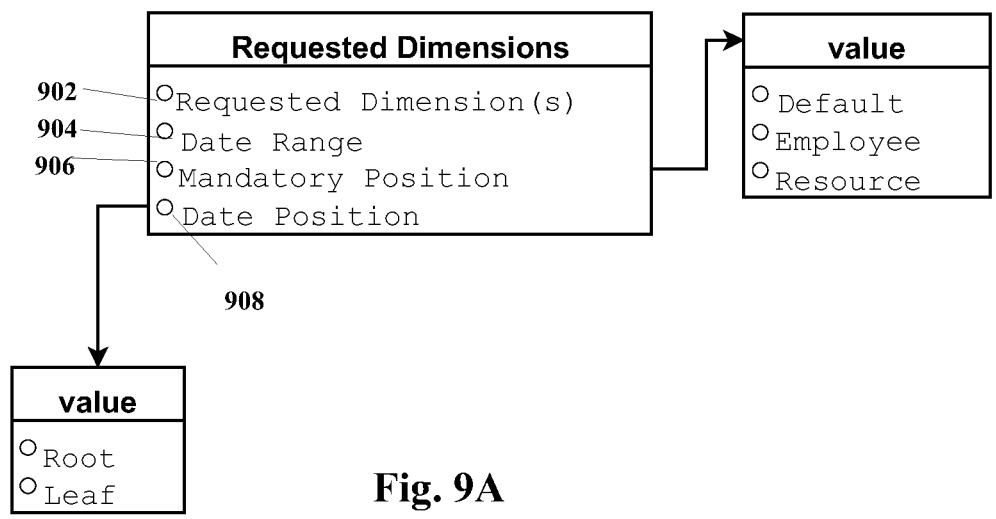
FIG. 9A and FIG. 9B depict an example illustrating attributes and relationships of a request dimension in accordance with the present invention.
Figure 9B:
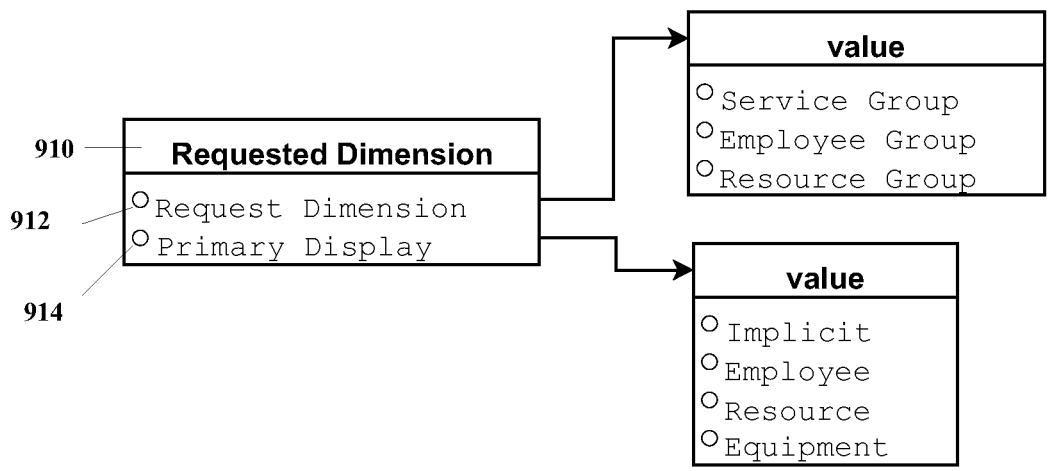
Figure 10A:
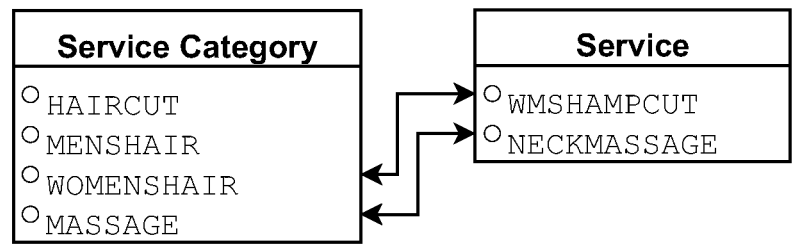
FIG. 10A, FIG. 10B, FIG. 10C, and FIG. 10D, collectively depict an example illustrating attributes and relationships of objects that will be mentioned throughout the specification in accordance with the present invention.
Figure 10B:
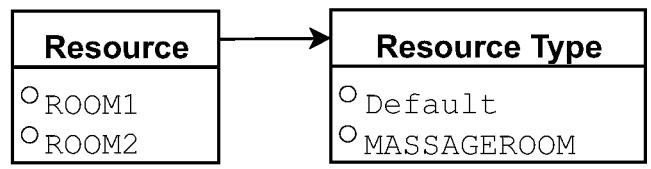
Figure 10C:
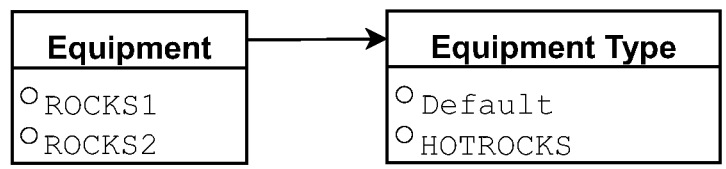
Figure 10D:
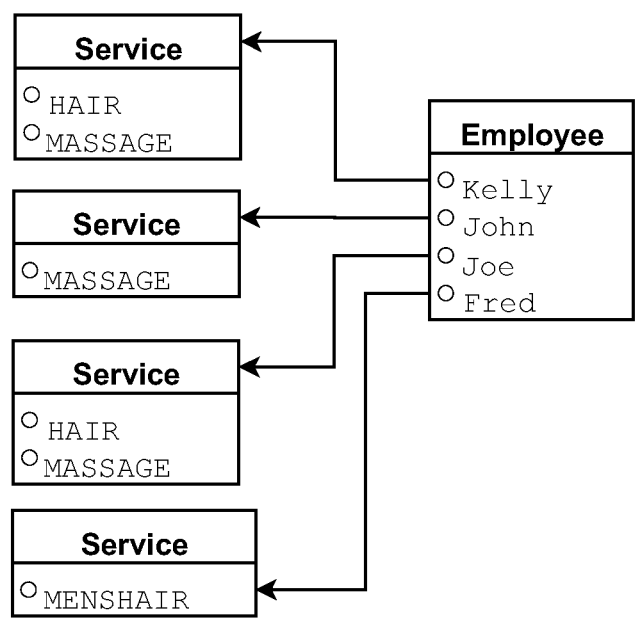

FIGS. 9A and 9B depict attributes and relationships of the request dimension. As referenced in FIG. 7, the request dimension is produced as a result of the continued processing of the inputted data. In the present example of the present invention, a request 900 is composed of four parts including: (1) requested dimensions 902, (2) date range 904, (3) mandatory position 906, and (4) date position 908. Requested dimensions 902 is a collection of one or more requested dimension 910. While four criteria are presented in FIG. 9A, one of ordinary skill in the art will readily recognize that more criteria or less criteria may be utilized to set the request dimension so that the result is tailored for the desired purpose. FIG. 9B illustrates an exemplary requested dimension 910 as containing only two criteria, namely (1) requested dimension 912 and (2) primary display dimension 914. Primary display dimension 914 is configurable with values such as implicit, employee, resource or equipment.

Referring back to FIG. 9A, mandatory dimension 906 allows the system to specify a dimension that is always included in a request dimension 900. In the present example mandatory dimension 906 is configurable with the value default, employee and resource to specify the mandatory dimension. Setting the mandatory dimension 906 is useful for a primary scheduling paradigm that is not by employee. For example, in the event a service provider schedules massage appointments by room rather than by employee, setting mandatory dimension 906 to resource requires the inclusion of the resource dimension in request 900. Setting the mandatory dimension 906 to employee requires that the current instance of the system include the employee dimension. When mandatory dimension 906 is set to default, a system configuration is used. This allows for configuring the mandatory dimension 906 of a plurality of instances of the intelligent conversation-based appointment tool running on one or more computer systems in fewer locations. This is advantageous to separately changing the mandatory dimension 906 of each conversation-based appointment tool, when the desire is to have all conversation-based appointment tools use the same configuration for mandatory dimension 906. The system configuration can be set to employee, resource or any other field determined by the service provider.

The date position 908 can have the values "default," "leaf," and "root." The leaf value results in the date being the last level in the hierarchy tree that determines the level that information is displayed (FIG. 11 through 14 provides example request dimensions depicting date position 908 configured to leaf). Configuring date position 908 as root sets the date as the root of the hierarchy. Other configurations of the date position may also be configured, such as tailoring the position to an alternate specific field depending on the desired application.

FIG. 10 (collectively, FIGS. 10A, 10B, 10C, and 10D) reflects examples illustrating attributes and relationships of objects common in the conversation-based appointment tool utilized in the salon industry and described in further detail in the subsequent figures. As shown in FIG. 10A, four service categories are common in the industry including HAIRCUT, MENSHAIR, WOMENSHAIR, and MASSAGE. Example subcategories of the services prescribed in FIG. 10A include WMSHAMPCUT and NECKMASSAGE. WMSHAMPCUT refers to women's shampoo and haircut, and is linked to the WOMENSHAIR service category. NECKMASSAGE is a neck massage and linked to the MASSAGE service category. In FIG. 10B the resources are ROOM1 and ROOM2 and there is a resource type of MASSAGEROOM. In FIG. 10C there are two equipments, ROCKS1 and ROCKS2 and an equipment type HOTROCKS. Those familiar with the salon-services industry will readily recognize that service categories MASSAGE and NECKMASSAGE will use the resource type MASSAGEROOM and equipment type of HOTROCKS. Finally, in the present example, four employees are presented in the system, namely (1) Kelly, (2) John, (3) Joe, and (4) Fred. Kelly's talent allows her to perform service categories HAIR and MASSAGE. John can perform the service category MASSAGE. Joe can perform service categories HAIR and MASSAGE. Fred can perform service category MENSHAIR. The date is assumed to be Jan. 1, 2012.

Figure 11:
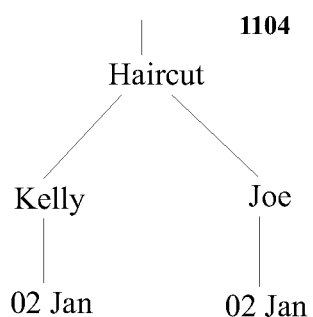

FIG. 11 presents one example showing the request dimension and response dimension of the conversation-based appointment tool, based on the parameters described in FIG. 10. For this example, the input 1100 is "Haircut tomorrow." In the block diagram 1102 of the request dimension, the requested dimension contains the service category Haircut, employee is set to anyone by default, and a date range is set at tomorrow (i.e., in the present example, January 2). Based on input 1100, the response dimension 1102 from the conversation-based appointment tool is structured in a hierarchy to facilitate the display of the results. As previously detailed, the response dimension 1102 has a top level that maps to the headers that appear in the response display 1106 that the operator sees as results. The subsequent levels of response dimension 1102 are "employee" followed by the date range. As shown in response display 1106, the response dimension 1102 results in a display where the input of the operator is utilized to prioritize the elements that display. In various embodiments, the response display does not show the word "haircut," but rather only lists employees that are qualified to provide haircuts, along with the date underneath. In these embodiments, the named employees' ability to provide a haircut is inherent in the response.

Figure 12:
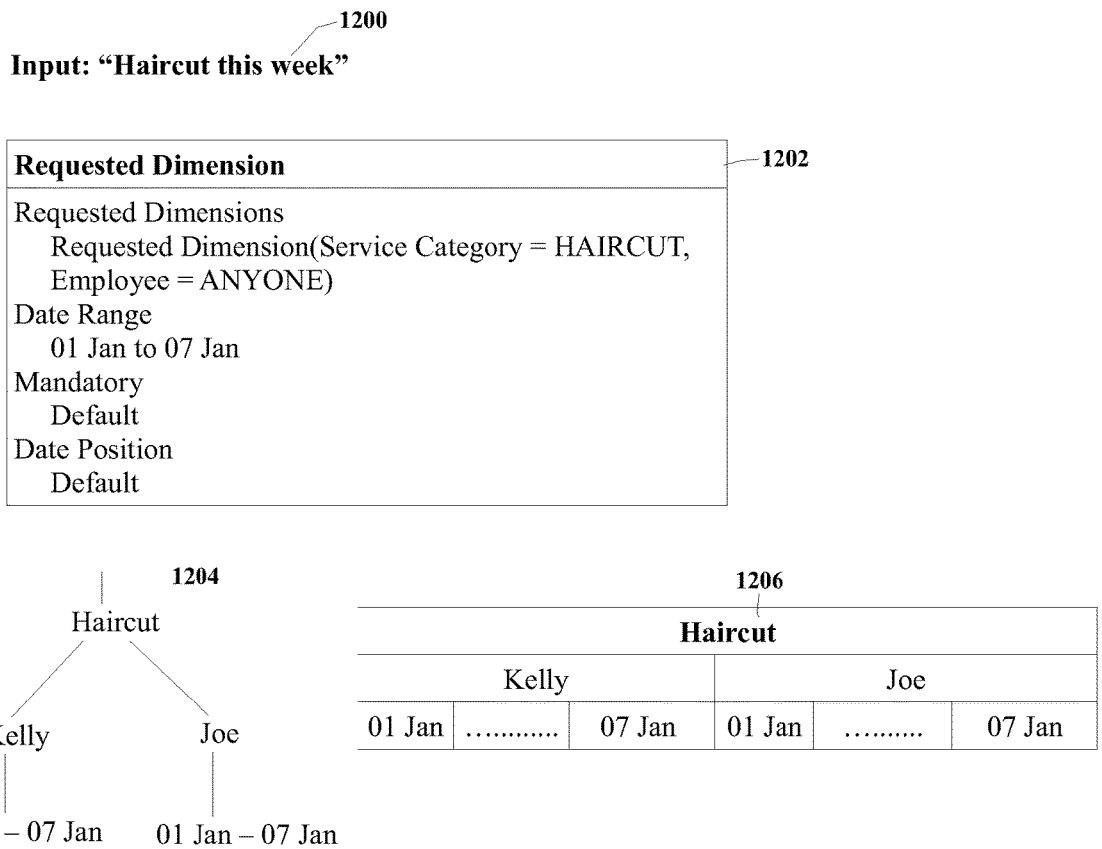

Request dimension and response dimension for an input into the conversation-based appointment tool is depicted in FIG. 12. In this example, input 1200 is "Haircut this week." Comparing this example to the previous example described in FIG. 11, only the date range has changed (i.e., "tomorrow" to "this week."). As a result, the requested dimensions and response dimensions change accordingly to reflect the information request. Based on the parameters prescribed by FIG. 10, the requested dimensions 1202 contain the requested dimension and various configuration values. The requested dimension includes the service category haircut, employees set to anyone, and a date range of January 2 to January 7. As shown in response display 1206, the response dimension 1204 results in a display that shows the rest of the week. As previously described, in various embodiments, the word "haircut" is omitted from the response display, and it is apparent to the operator that the named employees are qualified to provide a haircut.

Figure 13:
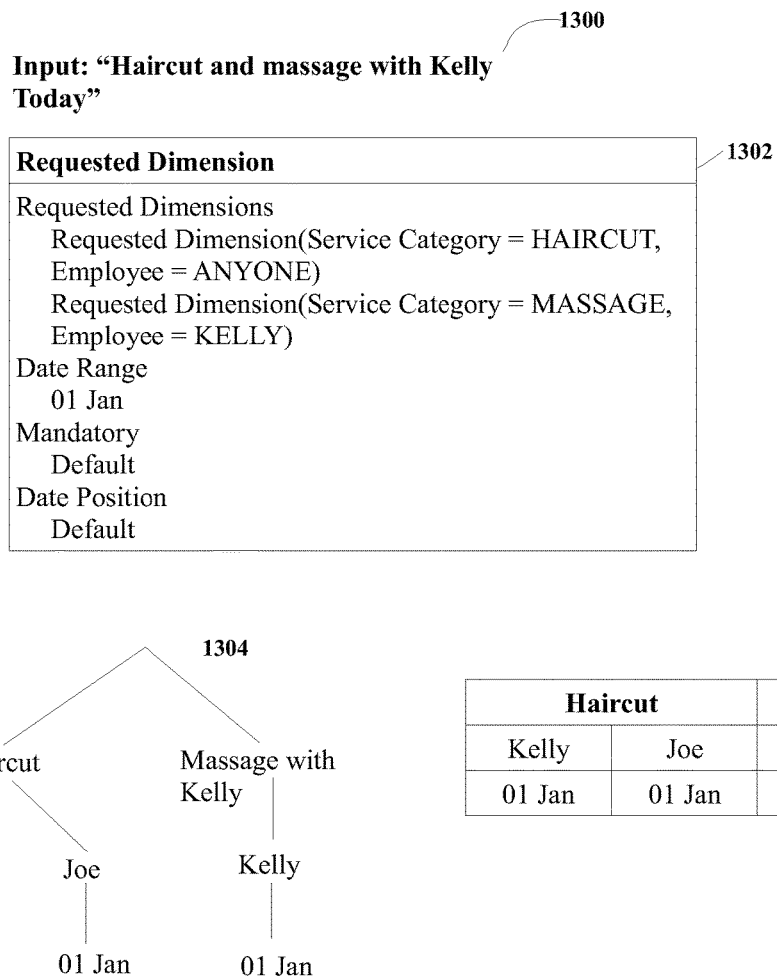

A further example of the conversation-based appointment tool defining the request dimension and response dimension is illustrated in FIG. 13. In this example, input 1300 is "Haircut and Massage with Kelly Today." In request dimension 1302, the requested dimensions contain two requested structures. In the first requested structure the service category is Haircut, employees is set to anyone and the primary display dimension is implicit. In the second requested structure the service category is massage, employee is Kelley and the primary display is implicit. The date range is January 1, et seq. As shown in response dimension 1304, the top level contains the headers "Haircut" and "Massage with Kelly." Traversing down the subcategories of header "Haircut" the employees Kelly and Joe were found that can perform the service. Below each employee are their available times. Traversing down the subcategories of header "Massage with Kelly," only Kelly's available times to perform a message are found. Response display 1306 reflects a graphical element in response to the response dimension 1304.

Referring next to FIG. 14, a further example of the conversation-based appointment tool processing is presented. In this example, input 1400 is "Haircut with Kelly, Massage with Anyone in Room 1 Today or Tomorrow." The structure of request dimension 1402 contains two requested dimensions. In the first structure, the service category is haircut, the employee is Kelly, and the primary display dimension is implicit. For the second structure, the service category is massage, the employee group is anyone, and resource group is room 1. The date range is January 1 and January 2. As shown in response dimension 1404, the top level contains the headers "Haircut with Kelly" and "Massage with Anyone." Traversing down the subcategories of "Haircut with Kelly," the available times of employee Kelly are displayed. However, for the subcategories of "Massage with Anyone," Joe and John are the only employees able to perform the massage service and as a result those two employees are presented. Based on the inputted criteria, the first requested dimension is pivoted on the employee Kelley and the second request dimension is pivoted on the resource room 1. In the present example, the conversation-based appointment tool infers from input 1404 that results for a haircut should pivot on employee Kelly, due to the presence of the term "with" followed by an employee name. Furthermore, the conversation-based appointment tool infers that results for massage should pivot on room 1, due to the presence of the term "in" followed by a resource name. In at least one embodiment of the present invention where multiple pivots are allowable, the conversation-based appointment tool is configurable, so that pivoting on a service category has a higher priority than an employee, and pivoting on a resource category has a higher priority than an equipment.

It is also contemplated by the present invention that the conversation-based appointment tool suggest other services that can be paired with the service the operator is requesting. For example, a service provider that provides haircuts is also likely to provide shampooing. After collecting an aggregate of data that shows that the haircut service and shampooing service are predominantly scheduled together, the conversation-based appointment tool can suggest combining a haircut with shampoo.

Although the present embodiment of the present invention focuses on scheduling appointments, the techniques can also be used for ordering items. For example, traditional inventory management systems have header columns for the product name, product description, price, availability, various other information columns. Furthermore the rows represent each item that the service provider may offer to customers. One of ordinary skill in the art will recognize that the techniques taught by this disclosure can be applied to inventory management systems to access and organize and inventory and display the results based on natural language.

While certain aspects of the device are presented below in certain claim forms, the inventor contemplates the various aspects of the system in any number of claim forms. Accordingly, the inventor reserves the right to add additional claims after filing the application to pursue such additional claim forms for other aspects of the system.

Thus, there has been summarized and outlined, generally in broad form, a plurality of the most important features of the present invention. While this summary is presented so that the novelty of the present contribution to the related art may be better appreciated, it will further be apparent that additional features of the invention described (which will form the subject matter of the claims appended hereto) will further define the scope, novelty, and in certain instances the improvements upon any existing art. The description provides specific details for a thorough understanding of, and enabling description for, various examples of the technology. One skilled in the art will understand that the technology may be practiced without many of these details and it is to be readily understood that the invention presented herein is not limited in its application to the details of construction and to the arrangements of the components set forth in the description or illustrated in the various figures integrated and categorized herein. For example, in some instances, well known structures and functions have not been shown or described in detail to avoid unnecessarily obscuring the description of the examples of the technology. It is intended that the terminology used in the description presented be interpreted in its broadest reasonable manner, even though it is being used in conjunction with a detailed description of certain examples of the technology. Although certain terms may be emphasized, any terminology intended to be interpreted in any restricted manner will be overtly and specifically defined as such in this Detailed Description section. Those skilled in the art will appreciate that the disclosure of the present invention may readily be utilized as a basis for forming other similar structures, methods and systems for carrying out the various purposes and objectives of the present invention. Thus, the claims as set forth shall allow for such equivalent constructions insofar as they do not depart.

What is claimed is:

1. An automated appointment scheduling tool operating on a computing device, the tool comprising:
   an input device for receiving user input comprising natural language relating to a user request for appointment scheduling;
   a matching component comprising a rules processor, for identifying relevant words correlating to a plurality of parameters comprising a service, a service provider, and a date range of said user request;
   a request dimension component, for correlating said relevant words to information stored within a database to identify and prioritize said parameters of said user request;
   a scheduling determination component, for identifying one or more available scheduling results which correlate to said prioritized parameters of said user request;
   an output component for providing a representation of one or more of said available scheduling results for selection;
   a response dimension component comprising a plurality of levels correlating to said prioritized parameters of said request dimension component;
   a screen display comprising a graphical user interface depicted on said output component;
   wherein said screen display comprises a dynamic header area and an appointment area;
   wherein said dynamic header area comprises a first level and a second level;
   wherein the first level comprises at least one first level user interface (UI) element comprising a first level UI element width and a first level UI element height;
   wherein said first level UI element width and said first level UI element height are not predefined, and said first level UI element width is correlated to the number of relevant words, or the type of relevant word, that correlates to the first prioritized parameter of said response dimension component;
   wherein the second level comprises at least one second level UI element comprising a second level UI element width and a second level UI element height;
   wherein said second level UI element width and said second level UI element height are not predefined, and said second level UI element width is correlated to the number of relevant words, or the type of relevant word, that correlates to the second prioritized parameter of said response dimension component;
   wherein said dynamic header area is configured to update based on said user request by mapping a top level of said response dimension component to said first level of said dynamic header area and mapping a second level of said response dimension component to said second level of said dynamic header area;
   wherein said one or more available scheduling results are mapped to said appointment area.

2. The automated appointment scheduling tool of claim 1, further comprising:
   a selection component for selection of one or more of said available scheduling results.

3. The automated appointment scheduling tool of claim 2, further comprising:
   a human operator for prompting said user to obtain said user request, inputting said user input relating to said user request into said input device, retrieving said available scheduling results from said output component, transmitting said available scheduling results to said user, and
   selecting said one or more available scheduling results.

4. The automated appointment scheduling tool of claim 2, further comprising:
   a translation component for interpreting said user request to determine said user input and transmitting said user input into said input device.

5. The automated appointment scheduling tool of claim 4, wherein:
   said translation component comprises a speech-to-text component for translating a user request received as speech input into text for inputting into said input device.

6. The automated appointment scheduling tool of claim 1, wherein:
   said matching component parses said relevant words into relevant parts of speech correlating to the parameters of said user request, and wherein said request dimension component correlates said user request to information stored within a database by said parts of speech to identify and prioritize said parameters of said user request.

7. The automated appointment scheduling tool of claim 1, wherein:

said matching component parses said relevant words into one or more categories selected from the group consisting of name, date, time, location, resource, equipment and service requested.

8. The automated appointment scheduling tool of claim 1, wherein said user input is received in a form comprised of at least one selected from the group consisting of:
   typed input;
   spoken input; and
   input provided via a graphical user interface.

9. The automated appointment scheduling tool of claim 1, wherein said representation of one or more of said available scheduling results is transmitted in a form comprised of at least one selected from the group consisting of:
   text output;
   sound output;
   synthetic speech output;
   sampled speech output;
   spoken output; and
   graphical output.

10. The automated appointment scheduling tool of claim 1, wherein said request dimension component prioritizes said parameters of said user request by ordering said relevant words based on the order of said user input.

11. The automated appointment scheduling tool of claim 1, wherein said scheduling determination component identifies one or more available scheduling results by:
   receiving said prioritized parameters relating to said user request from said request dimension component;
   obtaining, for the first prioritized parameter, first available scheduling results that conform to said first prioritized parameter; and
   narrowing said first available scheduling results to conform to the remaining prioritized parameters in accordance with the priority determined by said request dimension component.

12. The automated appointment scheduling tool of claim 1, wherein said automated appointment scheduling tool operates on at least one selected from the group consisting of:
   a telephone;
   a smartphone;
   a tablet computer;
   a laptop computer;
   a personal digital assistant;
   a desktop computer;
   a kiosk;
   a consumer electronic device;
   a consumer entertainment device;
   a music player;
   a camera;
   a television;
   a set-top box; and
   an electronic book reader.

13. A method for implementing an automated appointment scheduling tool operating on a computing device having at least one processor, the method comprising:
   receiving user input comprising natural language relating to a user request for appointment scheduling at an input device;
   utilizing a rules processor to identify relevant words correlating to a plurality of parameters comprising a service, a service provider, and a date range of said user request;
   correlating said relevant words to information stored within a database to identify and prioritize said parameters of said user request to generate prioritized parameters of said user request;
   generating a response dimension comprising a plurality of levels based on said prioritized parameters of said user request;
   identifying one or more available scheduling results which correlate to said prioritized parameters of said user request;
   providing a representation of one or more of said available scheduling results for selection;
   depicting a graphical user interface comprising a dynamic header area and an appointment area, wherein said dynamic header area comprises a first level and a second level and wherein said dynamic header is not predefined by an application;
   updating said dynamic header area in response to said user request by mapping a top level of said response dimension component to said first level of said dynamic header area and mapping a second level of said response dimension component to said second level of said dynamic header area;
   wherein said first level of said dynamic header comprises at least one first level user interface (UI) element comprising a first level UI element width and a first level UI element height;
   wherein said first level UI element width and said first level UI element height are not predefined, and said first level UI element width is correlated to the number of relevant words, or the type of relevant word, that correlates to a first one of said prioritized parameters;
   wherein the second level comprises at least one second level UI element comprising a second level UI element width and a second level UI element height;
   wherein said second level UI element width and said second level UI element height are not predefined, and said second level UI element width is correlated to the number of relevant words, or the type of relevant word, that correlates to a second one of said prioritized parameters;
   mapping said one or more available scheduling results to said appointment area; and
   wherein a prioritized parameter is not displayed in said dynamic header area when the prioritized parameter is applicable to all scheduling results mapped to said appointment area.

14. The automated appointment scheduling method of claim 13, further comprising the step of:
   selecting one or more of said available scheduling results; and
   mapping a user interface element width to at least one prioritized parameter of said response dimension component.

15. The automated appointment scheduling method of claim 13, further comprising the steps of:
   manually prompting said user to obtain said user request;
   manually inputting said user input relating to said user request;
   retrieving said available scheduling results from said output component;
   manually transmitting said available scheduling results to said user; and
   manually selecting said one or more available scheduling results.

16. The automated appointment scheduling method of claim 13, further comprising the step of:

automatically interpreting said user request to determine said user input and transmitting said user input into said input device.

17. The automated appointment scheduling method of claim 16, wherein:
said automatic interpreting step is accomplished via a speech-to-text component for translating a user request received as speech input into text for inputting into said input device.

18. The automated appointment scheduling method of claim 16, wherein:
said interpreting step comprises parsing said relevant words into relevant parts of speech correlating to the parameters of said user request.

19. The automated appointment scheduling method of claim 13, wherein:
said user input is received in a form comprised of at least one selected from the group consisting of:
typed input;
spoken input; and
input provided via a graphical user interface.

20. The automated appointment scheduling method of claim 13, wherein:
said representation is transmitted in the form of at least one selected from the group consisting of:
text output;
sound output;
synthetic speech output;
sampled speech output;
spoken output; and
graphical output.

21. The automated appointment scheduling method of claim 13, wherein said prioritization of said parameters of said user request is accomplished by ordering said relevant words based on the order of said user input.

22. The automated appointment scheduling method of claim 13, wherein said identification of one or more available scheduling results further comprises the steps of:
receiving said prioritized parameters relating to said user request;
obtaining, for the first prioritized parameter, first available scheduling results that conform to said first prioritized parameter; and
narrowing said first available scheduling results to conform to the remaining prioritized parameters in accordance with the respective priorities.

23. The automated appointment scheduling method of claim 13, wherein said automated appointment scheduling method is actuated on at least one selected from the group consisting of:
a telephone;
a smartphone;
a tablet computer;
a personal digital assistant;
a desktop computer;
a kiosk;
a consumer electronic device;
a consumer entertainment device;
a music player;
a camera;
a television;
a set-top box; and
an electronic book reader.

24. A computer program product for automated scheduling, the computer program product comprising non-transitory media storing instructions which, when executed by at least one data processor, result in operations comprising:

presenting a graphical user interface comprising a dynamic header area and an appointment area, wherein the dynamic header area comprises a first level and a second level;
receiving, from a user input device, user input comprising natural language comprising a user request for appointment scheduling;
identifying, from the user input, relevant words correlating to a plurality of parameters, the plurality of parameters comprising a service, a service provider, and a date range;
correlating the relevant words to information stored within a database to identify and prioritize the plurality of parameters to generated prioritized parameters;
generating a response dimension comprising a plurality of levels based on the prioritized parameters of the user request;
identifying one or more available scheduling results which correlate to the prioritized parameters;
providing a representation of one or more of the available scheduling results for selection on the graphical user interface;
updating the dynamic header area by mapping a top level of the response dimension component to the first level of the dynamic header area and mapping a second level of the response dimension component to the second level of the dynamic header area;
mapping the one or more available scheduling results to the appointment area;
wherein the first level comprises at least one first level user interface (UI) element comprising a first level UI element width and a first level UI element height;
wherein the first level UI element width and the first level UI element height are not predefined, and the first level UI element width is correlated to the number of relevant words, or the type of relevant word, that correlates to a first one of the prioritized parameters;
wherein the second level comprises at least one second level UI element comprising a second level UI element width and a second level UI element height;
wherein the second level UI element width and the second level UI element height are not predefined, and the second level UI element width is correlated to the number of relevant words, or the type of relevant word, that correlates to a second one of the prioritized parameters.

25. The computer program product as recited in claim 24, wherein the operations further comprise:
receiving, from the user input device, a second user input comprising natural language comprising a second user request for appointment scheduling;
identifying, from the second user input, a second set of relevant words correlating to a second plurality of parameters, the plurality of parameters comprising a service, a service provider, and a date range;
correlating the second set of relevant words to information stored within the database to identify and prioritize the second plurality of parameters;
generating an updated response dimension comprising an updated plurality of levels based on the prioritization of the second plurality of parameters;
identifying one or more new available scheduling results which correlate to the prioritized second plurality of parameters;
providing a representation of one or more of the new available scheduling results for selection on the graphical user interface;

updating the dynamic header area by mapping a top level of the updated response dimension component to the first level of the dynamic header area and mapping a second level of the updated response dimension component to the second level of the dynamic header area; and mapping the one or more new available scheduling results to the appointment area.

\* \* \* \* \*